United States Patent
Lee et al.

(10) Patent No.: US 12,513,273 B2
(45) Date of Patent: Dec. 30, 2025

(54) ELECTRONIC DEVICE FOR DISPLAYING 3D IMAGE AND OPERATION METHOD THEREOF

(71) Applicant: SAMSUNG ELECTRONICS CO., LTD., Suwon-si (KR)

(72) Inventors: Yeoul Lee, Suwon-si (KR); Bora Jin, Suwon-si (KR); Cheolseong Park, Suwon-si (KR); Youngjin Yoon, Suwon-si (KR); Jihye Lee, Suwon-si (KR); Kyungmin Lim, Suwon-si (KR); Sunil Lee, Suwon-si (KR); Jaesung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/056,395

(22) Filed: Feb. 18, 2025

(65) Prior Publication Data

US 2025/0193358 A1 Jun. 12, 2025

Related U.S. Application Data

(63) Continuation of application No. PCT/KR2023/011987, filed on Aug. 11, 2023.

(30) Foreign Application Priority Data

Aug. 18, 2022 (KR) ........................ 10-2022-0103410
Nov. 16, 2022 (KR) ........................ 10-2022-0153816

(51) Int. Cl.
*H04N 13/133* (2018.01)
*G06T 3/18* (2024.01)
(Continued)

(52) U.S. Cl.
CPC ............ *H04N 13/133* (2018.05); *G06T 3/18* (2024.01); *G06T 7/20* (2013.01); *H04N 13/144* (2018.05);
(Continued)

(58) Field of Classification Search
CPC ................... G02B 30/52; G06N 3/02; G06T 2207/20081; G06T 7/20; G06T 3/00; H04N 13/395; H04N 13/133; H04N 13/351
See application file for complete search history.

(56) References Cited

U.S. PATENT DOCUMENTS 8,848,006 B2    9/2014    Wetzstein et al.
10,495,893 B2   12/2019   Choi et al.
(Continued)

FOREIGN PATENT DOCUMENTS

CN    105872520 A    8/2016
CN    111565308 A    8/2020
(Continued)

OTHER PUBLICATIONS

"A Flexible Coding Scheme Based on Block Krylov Subspace Approximation for Light Field Displays with Stacked Multiplicative Layers"—Ravishankar et al., Sensors 2021, 21(13), 4574; https://doi.org/10.3390/s21134574; Published: Jul. 4, 2021 (Year: 2021).*

(Continued)

*Primary Examiner* — Mainul Hasan
(74) *Attorney, Agent, or Firm* — Sughrue Mion, PLLC

(57) ABSTRACT

An electronic device includes: a base panel; a layer panel; memory storing at least one instruction; and at least one processor, wherein the at least one instruction, when executed by the at least one processor, causes the electronic device to: obtain a first frame image in a first frame and a second frame image in a second frame before the first frame, (Continued)

generate a base image corresponding to the base panel in the first frame and a layer image corresponding to the layer panel in the first frame and based on a motion between the first frame image and the second frame image, generate a corrected base image based on the motion between the first frame image and the second frame image, and display the corrected base image on the base panel and display the layer image on the layer panel.

20 Claims, 14 Drawing Sheets

(51) Int. Cl.
 G06T 7/20 (2017.01)
 H04N 13/144 (2018.01)
 H04N 13/351 (2018.01)
 H04N 13/395 (2018.01)
(52) U.S. Cl.
 CPC ......... *H04N 13/351* (2018.05); *H04N 13/395* (2018.05); *G06T 2207/20081* (2013.01)

(56) References Cited

U.S. PATENT DOCUMENTS

| | | | |
|---|---|---|---|
| 10,598,948 B2 | 3/2020 | Yu et al. | |
| 11,575,882 B2 | 2/2023 | Jin et al. | |
| 11,719,930 B2 | 8/2023 | Lee et al. | |
| 11,756,493 B2 | 9/2023 | Lee et al. | |
| 11,804,155 B2 | 10/2023 | Lim et al. | |
| 11,917,124 B2 | 2/2024 | Kim et al. | |
| 11,948,485 B2 | 4/2024 | Jin et al. | |
| 2015/0172641 A1 | 6/2015 | Nakamura et al. | |
| 2017/0085867 A1* | 3/2017 | Baran | B41M 3/008 |
| 2021/0182616 A1* | 6/2021 | Huang | G06N 3/04 |
| 2021/0203917 A1 | 7/2021 | Jin et al. | |
| 2023/0344974 A1* | 10/2023 | Li | H04N 13/161 |
| 2024/0153038 A1* | 5/2024 | Duan | G06V 10/26 |
| 2024/0320808 A1* | 9/2024 | Wu | G06T 5/80 |

FOREIGN PATENT DOCUMENTS

| | | | |
|---|---|---|---|
| JP | 2015-119203 A | 6/2015 | |
| JP | 10-1670970 B1 | 11/2016 | |
| JP | 2020-154732 A | 9/2020 | |
| KR | 10-1825063 B1 | 2/2018 | |
| KR | 10-2018-0064884 A | 6/2018 | |
| KR | 10-2021-0084230 A | 7/2021 | |
| KR | 10-2022-0032448 A | 3/2022 | |
| KR | 10-2022-0067950 A | 5/2022 | |
| KR | 10-2022-0067966 A | 5/2022 | |
| KR | 10-2022-0092247 A | 7/2022 | |
| KR | 10-2022-0093975 A | 7/2022 | |
| KR | 10-2743749 B1 | 12/2024 | |
| WO | WO-2022039542 A1 * | 2/2022 | G06N 3/045 |

OTHER PUBLICATIONS

International Search Report and Written Opinion (PCT/ISA/220, PCT/ISA/210, and PCT/ISA/237) dated Nov. 11, 2023, issued by International Searching Authority for International Application No. PCT/KR2023/011987.

Takahashi et al., "From Focal Stack to Tensor Light-Field Display", IEEE Transactions on Image Processing, Sep. 2018, pp. 4571-4584, vol. 27, doi:10.1109/TIP.2018.2839263.

Lai et al., "Learning Blind Video Temporal Consistency", ArXiv, Aug. 1, 2018, 16 total pages, arXiv:1808.00449v1, doi:10.48550/arXiv.1808.00449.

* cited by examiner

ELECTRONIC DEVICE FOR DISPLAYING 3D IMAGE AND OPERATION METHOD THEREOF

CROSS-REFERENCE TO RELATED APPLICATIONS

This application is a continuation application of International Application No. PCT/KR2023/011987, filed on Aug. 11, 2023, which claims priority to Korean Patent Application No. 10-2022-0103410, filed on Aug. 18, 2022, and Korean Patent Application No. 10-2022-0153816, filed on Nov. 16, 2022, the disclosures of which are incorporated by reference herein in their entireties.

BACKGROUND

1. Field

The disclosure relates to an electronic device for displaying a 3D image and a method of operating the electronic device.

2. Description of Related Art

With the advancement of electronic technologies, various types of electronic devices are being developed and released. Electronic devices including a display device for displaying images have advanced rapidly in recent years.

As display devices advance, types of images to be displayed on the display devices have also been diversified. A display device that is able to display not only two-dimensional (2D) images but also three-dimensional (3D) images is being developed.

A device and method for displaying 3D images by using a volumetric display capable of displaying an object in 3D space has recently been suggested to display 3D images. In particular, a stacked display including a plurality of stacked display panels and providing a 3D image by displaying an image on each of the plurality of display panels has been provided.

The stacked display displays the 3D image by displaying, on the plurality of stacked display panels, a plurality of images obtained based on light field images captured from different views, respectively.

SUMMARY

One or more embodiments provide a method of editing content being played in a display device and an electronic device therefor, by which the content being played in the display device may be edited adaptively.

According to an aspect of the disclosure, an electronic device includes: a base panel; a layer panel on the base panel; memory storing at least one instruction; and at least one processor configured to execute the at least one instruction stored in the memory, wherein the at least one instruction, when executed by the at least one processor, causes the electronic device to: obtain a first frame image in a first frame and a second frame image in a second frame before the first frame, generate, by applying the first frame image and the second frame image to an image generation module, a base image corresponding to the base panel in the first frame and a layer image corresponding to the layer panel in the first frame and based on a motion between the first frame image and the second frame image, generate a corrected base image based on the motion between the first frame image and the second frame image by applying the base image or the layer image to an image correction module, and display the corrected base image on the base panel and display the layer image on the layer panel.

The electronic device may further include an optical layer between the base panel and the layer panel, wherein the base image includes a plurality of sub-base images corresponding to a plurality of different views, respectively, and the at least one instruction, when executed by the at least one processor, causes the electronic device to generate, by applying the base image or the layer image to the image correction module, the corrected base image that is based on a difference between the plurality of sub-base images from the plurality of different views and includes a plurality of sub-corrected base images.

The image generation module may include a first artificial intelligence (AI) model trained to infer the base image and the layer image, based on the first frame image and the second frame image, and wherein the first AI model is configured to: obtain a first training frame image in a first training frame and a second training frame image in the second frame before the first frame, extract a motion between the first training frame image and the second training frame image, use the extracted motion to warp an already-generated comparison layer image corresponding to the layer panel in the second frame, and be trained based on a first loss function based on a layer training image corresponding to the layer panel in the first frame and the warped comparison layer image, which are generated through the first AI model.

Each of the first training frame image and the second training frame image may include a plurality of view images for training which are obtained from a plurality of different views, and the motion between the first training frame image and the second training frame image may be extracted from a center view image obtained from a center view among the plurality of view images for training included in the first training frame image and a center view image obtained from the center view among the plurality of view images for training included in the second training frame image.

The first loss function may be determined based on a difference between the layer training image and the warped comparison layer image, and the first AI model may be trained to reduce the difference between the layer training image and the warped comparison layer image based on the first loss function.

The first AI model may be configured to: generate, by applying the first training frame image and the second training frame image to the first AI model, a base training image corresponding to the base panel in the first frame and the layer training image corresponding to the layer panel in the first frame, obtain an output training image in the first frame based on the base training image, the layer training image, brightness information of the base panel and brightness information of the layer panel, and be trained based on a second loss function based on a difference between the first training frame image and the output training image.

The at least one instruction, when executed by the at least one processor, may cause the electronic device to generate the corrected base image by applying the first frame image and the layer image to the image correction module.

The first frame image may include a plurality of view images obtained from the plurality of different views, the at least one instruction, when executed by the at least one processor, may cause the electronic device to execute the at least one instruction to generate the corrected base image by applying the first frame image, the layer image and a plurality of shift values corresponding to the plurality of different views, respectively, the image correction module may include instructions for performing an operation or function of shifting the layer image by using each of the plurality of shift values, and generating the corrected base image by using each of the plurality of view images and a plurality of shifted layer images corresponding to the plurality of view images, and the plurality of shift values may be determined based on at least one of a distance between the base panel and the layer panel, a resolution of the layer panel or the plurality of different views.

The image correction module may include a second AI model trained to infer the corrected base image, based on the base image and a reference shift value, the second AI model may be configured to: obtain the reference shift value and a base training image including a plurality of sub-base training images corresponding to the plurality of different views which are generated through the image generation module, shift each of the plurality of sub-base training images by using the reference shift value, and be trained based on a third loss function based on a corrected base training image and the shifted base training image, which are generated through the second AI model, and the reference shift value may be determined based on at least one of a distance between the base panel and the layer panel or a resolution of the layer panel.

The third loss function may be identified based on a difference between a sub-corrected base training image corresponding to a first view among a plurality of sub-corrected base training images included in the corrected base training image and a sub-base training image obtained by shifting a sub-base training image corresponding to a second view adjacent to the first view among the plurality of shifted sub-base training images included in the shifted base training image, and the second AI model may be trained to reduce the difference between the sub-corrected base training image and the shifted sub-base training image based on the third loss function.

According to an aspect of the disclosure, a method of operating an electronic device including a base panel and a layer panel arranged on the base panel, includes: obtaining a first frame image in a first frame and a second frame image in a second frame before the first frame; generating, by applying the first frame image and the second frame image to an image generation module, a base image corresponding to the base panel in the first frame and a layer image corresponding to the layer panel in the first frame and based on a motion between the first frame image and the second frame image; generating a corrected base image based on the motion between the first frame image and the second frame image by applying the base image or the layer image to an image correction module; and displaying the corrected base image on the base panel and displaying the layer image on the layer panel.

The electronic device may include an optical layer between the base panel and the layer panel, the base image may include a plurality of sub-base images corresponding to a plurality of different views, respectively, and the generating of the corrected base image may include generating, by applying the base image or the layer image to the image correction module, the corrected base image that is based on a difference between the plurality of sub-base images from the plurality of different views and includes a plurality of sub-corrected base images.

The image generation module may include a first artificial intelligence (AI) model trained to infer the base image and the layer image, based on the first frame image and the second frame image, and the first AI model is trained by: obtaining a first training frame image in a first training frame and a second training frame image in the second frame before the first frame; extracting a motion between the first training frame image and the second training frame image; using the extracted motion to warp an already-generated comparison layer image corresponding to the layer panel in the second frame; and training the first AI model based on a first loss function based on a layer image for training corresponding to the layer panel in the first frame and the warped comparison layer image, which are generated through the first AI model.

Each of the first training frame image and the second training frame image may include a plurality of view images for training obtained from a plurality of different views, and in the extracting of the motion between the first training frame image and the second training frame image, the motion may be extracted from a center view image obtained from a center view among the plurality of view images for training included in the first training frame image and a center view image obtained from the center view among the plurality of view images for training included in the second training frame image.

The first AI model is trained by generating a base image for training corresponding to the base panel in the first frame and a layer image for training corresponding to the layer panel in the first frame by applying the first frame image for training and the second frame image for training to the first AI model; obtaining an output image for training in the first frame based on the base image for training, the layer image for training, brightness information of the base panel and brightness information of the layer panel; and training the first AI model based on a second loss function based on a difference between the first frame image for training and the output image for training.

The generating of the corrected base image may include generating the corrected base image by applying the first frame image and the layer image to the image correction module.

The first frame image may include a plurality of view images obtained from a plurality of different views. The generating of the corrected base image may include generating the corrected base image by applying the first frame image, the layer image and a plurality of shift values corresponding to multiple views, respectively. The image correction module may include instructions for performing an operation or function of shifting the layer image by using each of the plurality of shift values; and instructions for performing an operation or function of generating a corrected base image by using each of the plurality of view images and a plurality of shifted layer images corresponding to the plurality of view images. The plurality of shift values may be determined based on at least one of a distance between the base panel and the layer panel, a resolution of the layer panel or a plurality of different views.

The image correcting module may include a second AI model trained to infer a corrected base image based on the base image. The second AI model is trained by obtaining a reference shift value and a base image for training including a plurality of sub-base images for training corresponding to the plurality of different views which are generated through the image generation module; shifting each of the plurality of base images for training by using the reference shift value; training the second AI model based on a third loss function based on the corrected base image for training and the shifted base image for training, which are generated through the second AI model.

The second AI model is trained by based on the third loss function may include calculating the third loss function based on a difference between a sub-corrected base image for training corresponding to a first view among the plurality of sub-corrected base images for training included in the corrected base image for training and a shifted sub-base image for training corresponding to a second view adjacent to the first view among the plurality of shifted sub-base images for training included in the shifted base image for training; and training the second AI model to have a smaller difference between the sub-corrected base image for training and the shifted sub-base image for training based on the third loss function.

According to an aspect of the disclosure, a non-transitory computer-readable recording medium has a program recorded thereon for a computer to perform a method of operating an electronic device including a base panel and a layer panel arranged on the base panel, the method including: obtaining a first frame image in a first frame and a second frame image in a second frame before the first frame; generating, by applying the first frame image and the second frame image to an image generation module, a base image corresponding to the base panel in the first frame and a layer image corresponding to the layer panel in the first frame and based on a motion between the first frame image and the second frame image; generating a corrected base image based on the motion between the first frame image and the second frame image by applying the base image or the layer image to an image correction module; and displaying the corrected base image on the base panel and displaying the layer image on the layer panel.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
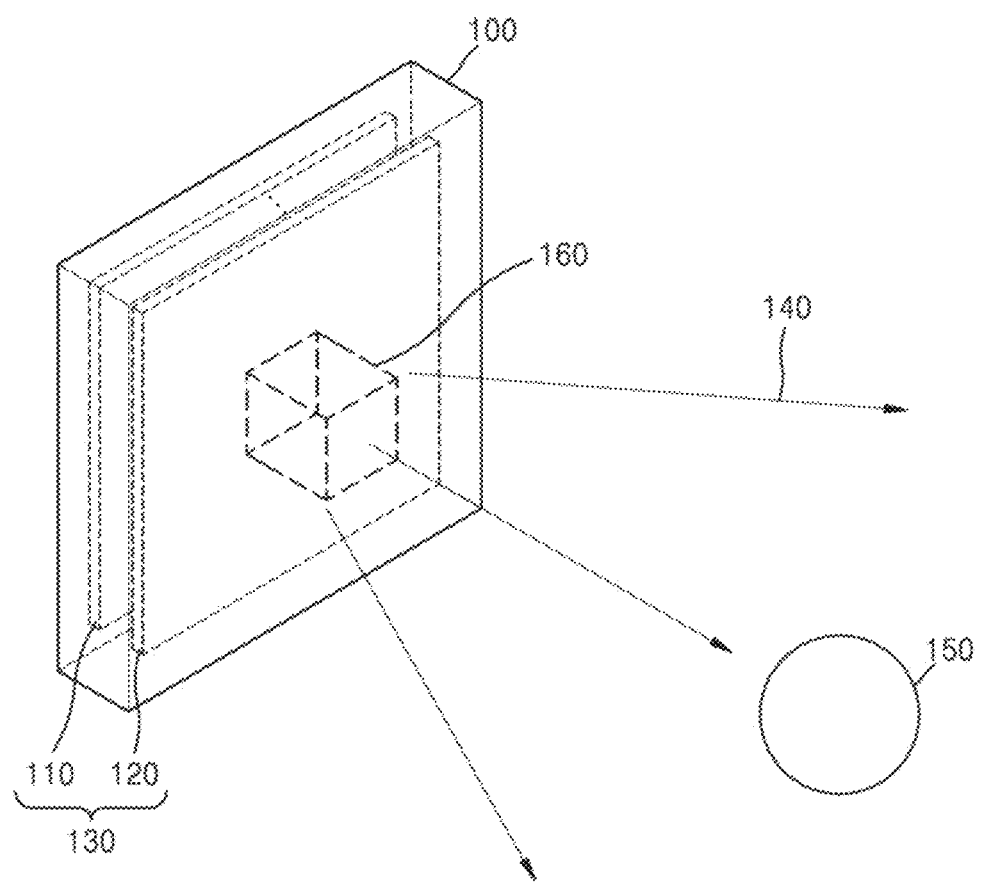
FIG. 1 is a diagram for illustrating an electronic device, according to an embodiment of the disclosure.

Terms as used herein will be described before detailed descriptions of embodiments of the disclosure are provided.

The terms are selected as common terms that are currently widely used, taking into account principles of the disclosure, which may however depend on intentions of those of ordinary skill in the art, judicial precedents, emergence of new technologies, and the like. Some terms as used herein are selected at the applicant's discretion, in which case, the terms will be explained later in detail in connection with embodiments of the disclosure. Therefore, the terms should be defined based on their meanings and descriptions throughout the disclosure.

As used herein, the singular forms "a", "an" and "the" are intended to include the plural forms as well, unless the context clearly indicates otherwise. All terms including technical and scientific terms used herein have the same meaning as commonly understood by one of ordinary skill in the art to which this disclosure belongs.

The term "include (or including)" or "comprise (or comprising)" is inclusive or open-ended and does not exclude additional, unrecited elements or method steps. The terms "unit", "module", "block", etc., as used herein each represent a unit for handling at least one function or operation, and may be implemented in hardware, software, or a combination thereof.

In the disclosure, the expression "configured to" as herein used may be interchangeably used with "suitable for", "having the capacity to", "designed to", "adapted to", "made to", or "capable of" according to the given situation. The expression "configured to" may not necessarily mean "specifically designed to" in terms of hardware. For example, in some situations, an expression "a system configured to do something" may refer to "an entity able to do something in cooperation with" another device or parts. For example, "a processor configured to perform A, B and C functions" may refer to a dedicated processor, e.g., an embedded processor for performing A, B and C functions, or a general purpose processor, e.g., a Central Processing Unit (CPU) or an application processor that may perform A, B and C functions by executing one or more software programs stored in a memory.

When the term "connected" or "coupled" is used, a component may be directly connected or coupled to another component. However, unless otherwise defined, it is also understood that the component may be indirectly connected or coupled to the other component via another new component.

An embodiment of the disclosure will now be described in detail with reference to accompanying drawings so as to be readily practiced by those of ordinary skill in the art. However, an embodiment of the disclosure may be implemented in many different forms, and is not limited to that discussed herein. In the drawings, parts unrelated to the description are omitted for clarity, and like numerals refer to like elements throughout the specification.

Embodiments of the disclosure will now be described in detail with reference to accompanying drawings.

FIG. 1 is a diagram for describing an electronic device, according to an embodiment of the disclosure.

Referring to FIG. 1, an electronic device 100 may include a display 130 in an embodiment of the disclosure. The electronic device 100 may display an image 160 through the display 130.

In an embodiment, depending on the position of a user 150, the image 160 to be provided by the electronic device 100 for the user 150 through the display 130 may be changed. In an embodiment, the image 160 provided by the electronic device 100 may be an image that may render a three dimensional (3D) effect to the user 150 who uses the electronic device 100.

In an embodiment, the electronic device 100 represents light reflected from a real object and provided to the user 150. In an embodiment, the electronic device 100 provides the user 150 with light 140 having the same path as the light reflected from the real object and provided to the user 150. The user 150 is provided with the light 140 having the same path as the light reflected and provided from the real object, through the image 160 displayed on the electronic device 100. Accordingly, the user 150 may experience the 3D effect of the object included in the image 160 displayed on the electronic device 100 as if seeing a real object.

In an embodiment, the electronic device 100 may provide a different image 160 depending on the position of the user 150 to make the user 150 feel a sense of the 3D effect of the object included in the image 160. For convenience of explanation, the image 160 is described as including an object shaped like a hexahedron as shown in FIG. 1.

In an embodiment, when the user 150 is positioned in front of the electronic device 100, the electronic device 100 may provide the image 160 that includes the front of the object to the user 150.

In an embodiment, when the user 150 is positioned not in front of the electronic device 100 but in a first direction that crosses a direction perpendicular to the front, the electronic device 100 may provide the image 160 that includes a first aspect and the front of the object to the user 150. In an embodiment, depending on the angle between the direction perpendicular to the front and the first direction, the first aspect of the object and the front of the object included in the image 160 provided by the electronic device 100 to the user 150 may be changed. In an embodiment, depending on the angle between the direction perpendicular to the front and the first direction, the electronic device 100 may provide the image 160 including only the first aspect of the object to the user 150.

In an embodiment, when the user 150 is positioned in a second direction that crosses the direction perpendicular to the front of the electronic device 100 and that is different from the first direction, the electronic device 100 may provide the image 160 that includes a second aspect, which is different from the first aspect, and the front of the object to the user 150. In an embodiment, depending on the angle between the direction perpendicular to the front and the second direction, the second aspect of the object and the front of the object included in the image 160 provided by the electronic device 100 to the user 150 may be changed. In an embodiment, depending on the angle between the direction perpendicular to the front and the second direction, the electronic device 100 may provide the image 160 including only the second aspect of the object to the user 150.

In an embodiment, the first aspect and the front of the object may be an area of the object that may be seen when the user 150 looks, in reality, at the object from the first direction that crosses the direction perpendicular to the front of the object. In an embodiment, the second aspect and the front of the object may be an area of the object that may be seen when the user 150 looks, in reality, at the object from the second direction that crosses the direction perpendicular to the front of the object.

In an embodiment, the electronic device 100 may provide the light 140 to the user 150 through the image 160 as if the object is viewed in reality. Accordingly, the user 150 may feel a sense of 3D effect of the object included in the image 160 displayed on the electronic device 100.

In an embodiment, the electronic device 100 may provide different images 160 to the left and right eyes of the user 150, respectively, allowing the user 150 to experience binocular disparity. In an embodiment, the first direction may be a direction in which the user 150 looks at the electronic device 100 through the left eye. The second direction may be a direction in which the user 150 looks at the electronic device 100 through the right eye. The user 150 may feel the binocular disparity due to a difference between the images 160 provided to the left and right eyes, and thus, experience the 3D effect of the object.

In an embodiment, the display 130 may include a plurality of panels 110 and 120. In an embodiment, the plurality of panels 110 and 120 may be placed in a stack. Although the display 130 is shown as including two panels 110 and 120 in FIG. 1, the disclosure is not limited thereto. The display 13 may include three or more panels. Furthermore, the display 130 may also include an optical layer 213 (see FIG. 3) arranged between the plurality of panels. The electronic device 100 may provide the image 160 to the user 150 by displaying base and layer images, which will be described later, on the two panels 110 and 120, respectively.

Figure 2:
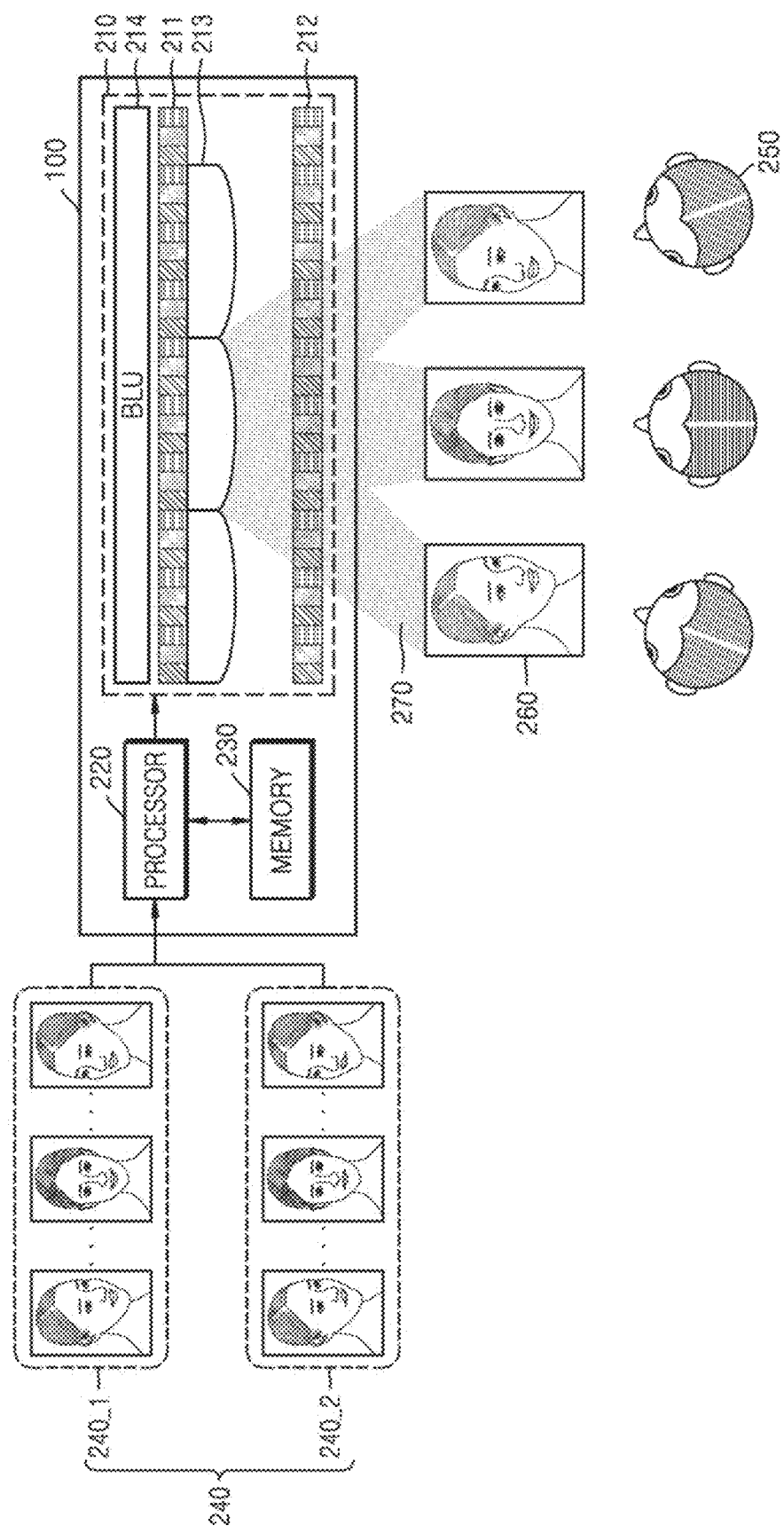
FIG. 2 is a diagram for illustrating operation of an electronic device, according to an embodiment of the disclosure.

FIG. 2 is a diagram for describing operation of an electronic device, according to an embodiment of the disclosure. Descriptions of an overlapping configuration with that of FIG. 1 will not be repeated.

Referring to FIG. 2, the electronic device 100 may include a display 210, a memory 230 for storing at least one instruction and at least one processor 220. The at least one processor 220 may execute the at least one instruction included in the memory 230 to control an operation of the electronic device 100. In an embodiment, the display 210 may include a base panel 211, a layer panel 212, an optical layer 213 and a backlight 214.

In an embodiment, an input content 240 may include information about an image 260 to be provided to a user 250 through the electronic device 100. The input content 240 may include a plurality of frame images corresponding to a plurality of frames, respectively. The input content 240 may include information about the image 260 displayed by sequential arrangement of the plurality of frames images.

In an embodiment, the input content 240 may be information obtained by capturing a real object from a plurality of different views. The input content 240 may be information obtained by capturing a real object from the plurality of different views during the plurality of frames. The disclosure is not, however, limited thereto, and the input content 240 may include information generated to provide images of the object from the plurality of different views to the user 250.

In an embodiment, when the real object moves during the plurality of frames, positions of the object included in the plurality of frame images included in the input content 240 may be different from one another. For example, when the real object moves during the plurality of frames, positions of the object included in the plurality of frame images may be different from one another. When a portion of the real object moves during the plurality of frames, positions corresponding to the moving portion of the real object among objects included in the plurality of frame images may be different.

The input content 240 may also be information obtained by capturing the real object through a camera located in the plurality of different views. The input content 240 may be information obtained by capturing the real object from the plurality of different views through a plurality of cameras.

In an embodiment, the at least one processor 220 may obtain a first frame image 240_1 in a first frame of the input content 240 and a second frame image 240_2 in a second frame right before the first frame. When the input content 240 includes information about the image 260 that has a motion during the first frame and the second frame, a position of an object included in the first frame image 240_1 may be different from a position of the object included in the second frame image 240_2.

In an embodiment, the input content 240 may include a plurality of view images obtained by capturing an object from a plurality of different views. In an embodiment, the plurality of view images may be obtained through a plurality of cameras placed in different positions to capture the object from different views. Furthermore, in an embodiment, the plurality of view images may be obtained from different views through a camera including a micro lens array. For convenience of explanation, the plurality of view images are defined as images obtained through a plurality of cameras that capture an object from different views.

In an embodiment, the first frame image 240_1 and the second frame image 240_2 included in the input content 240 may each include images with the plurality of different views.

In FIG. 2, shown is the input content 240 including a face of a person. The input content 240 may include information obtained by capturing the face of the person whose face expression or position is changed during the first frame and the second frame. A face expression of the person included in the first frame image 240_1 may be different from a face expression of the person included in the second frame image 240_2. However, what is shown in FIG. 2 is for convenience of explanation, and the object is not limited to the person's face figure. The input content 240 may include information obtained by capturing various kinds of objects.

In an embodiment, the electronic device 100 is provided with the input content 240. In an embodiment, the at least one processor 220 included in the electronic device 100 may be provided with the first frame image 240_1 and the second frame image 240_2.

The at least one processor 220 may execute the at least one instruction included in the memory 230 to generate a corrected base image and a layer image to be displayed on the display 210 in the first frame based on the first frame image 240_1, which is an image in the first frame of the input content 240, and the second frame image 240_2, which is an image in the second frame of the input content 240.

The at least one processor 220 may provide the image 260 that represents the captured object to the user 250 by displaying the corrected base image on the base panel 211 and displaying the layer image on the layer panel 212.

How the at least one processor 220 generates the corrected base image and the layer image will be described later in connection with FIGS. 4 to 12B.

In an embodiment, the display 210 is shown as including the backlight 214 and the optical layer 213 in FIG. 2. In an embodiment, the backlight 214 may generate light and provide the light to the user 250. In an embodiment, the light generated by the backlight 214 may be white light. The disclosure is not, however, limited thereto, and the light provided by the backlight 214 may have other colors than the white color.

In an embodiment, the base panel 211 and the layer panel 212 may each include a plurality of pixels. In an embodiment, when the base panel 211 and the layer panel 212 are a liquid crystal display, each of the base panel 211 and the layer panel 212 may include a filter layer including a plurality of color filters. In an embodiment, each of the plurality of pixels may correspond to a plurality of color filters.

In an embodiment, at least one of the base panel 211 or the layer panel 212 may include a plurality of red pixels, a plurality of green pixels and a plurality of blue pixels. In an embodiment, at least one of the base panel 211 or the layer panel 212 may include a plurality of red pixels, a plurality of green pixels, a plurality of blue pixels and a plurality of openings that do not filter the light. In an embodiment, at least one of the base panel 211 or the layer panel 212 may include a plurality of yellow pixels and a plurality of blue pixels.

The disclosure is not, however, limited thereto. In an embodiment, the plurality of pixels included in the base panel 211 and the layer panel 212 may change in color according to a color combination to display the image 260 by using the wavelength of the light provided from the backlight 214 and the light provided from the backlight 214.

In an embodiment, the optical layer 213 may be arranged between the base panel 211 and the layer panel 212. Light 270 that has passed the base panel 211 may be refracted, reflected or dispersed by the optical layer 213 and then provided to the layer panel 212. Although the optical layer 213 is shown in FIG. 2 as being arranged between the base panel 211 and the layer panel 212, the disclosure is not limited thereto. In an embodiment, when the display 210 includes three or more panels, the optical layer 213 may be placed in other location than between the base panel 211 and the layer panel 212. Furthermore, in an embodiment, the optical layer 213 may be omitted. For convenience of explanation, it is described that the light 270 passing the optical layer 213 is refracted.

In an embodiment, the light 270 provided by the backlight 214 may pass the base panel 211 and the layer panel 212 and may be provided to the user 250.

In an embodiment, the light 270 generated by the backlight 214 may be provided to the user 250 through a pixel included on the base panel 211 and a pixel included on the layer panel 212. The wavelength and intensity of the light 270 provided for the user 250 is determined according to at least one of transmissivity or colors of the pixel on the base panel 211 and the pixel on the layer panel 212 through which the light 270 generated by the backlight 214 passes. The wavelength and intensity of the light 270 provided for the user 250 is determined according to a combination of the pixel on the base panel 211 and the pixel on the layer panel 212 through which the light 270 generated by the backlight 214 passes.

In this case, depending on the position of the user 250, there is a change in pixel on the base panel 211 and pixel on the layer panel 212 through which the light 270 generated by the backlight 214 passes to reach the user 250. In an embodiment, depending on the position of the user 250, there may be a change in combination of the pixel on the base panel 211 and pixel on the layer panel 212 through which the light 270 generated by the backlight 214 passes to reach the user 250. Specifically, depending on the position of the user 250, there may be a change in transmissivity or colors of the pixel on the base panel 211 and the pixel on the layer panel 212 through which the light 270 generated by the backlight 214 passes to reach the user 250.

In an embodiment, when the display 210 includes the optical layer 213, the light 270 provided by the backlight 214 may be transmitted through the base panel 211, refracted by the optical layer 213, transmitted through the layer panel 212, and provided to the user 250. The light having a path that is changed by being refracted by the optical layer 213 may be provided to the user 250 in a position corresponding to the changed path.

In an embodiment, the optical layer 213 may include at least one lens. Although the optical layer 213 is shown as including three lenses in FIG. 2, the disclosure is not limited thereto. The optical layer 213 may include two or less lenses or four or more lenses.

In an embodiment, depending on a position relation between the pixel included on the base panel 211 and the at least one lens included on the optical layer 213, and the number, shape and refraction index of the at least one lens, the light 270 that has passed the base panel 211 is refracted so that a path toward the layer panel 212 may be changed. The light having the path refracted by the optical layer 213 may be transmitted through the layer panel 212 and provided to the user 250 who looks at the electronic device 100 in a position corresponding to the path. Accordingly, light that has passed a pixel on the base panel 211 and a pixel on the layer panel 212, which are different depending on the position of the user 150, may be provided to the user 250, so that the image 260 including a different aspect of the object may be provided for the user 250.

In an embodiment, when the display 210 includes the optical layer 213, an angle formed by the path of the light that has transmitted through the base panel 211 and a direction perpendicular to the front of the electronic device 100 may increase as compared to an occasion when the optical layer 213 is not included. Accordingly, a viewing angle within which the user 250 may see the image 260 through the electronic device 100 may increase. Furthermore, by controlling the number, shape, refraction index, etc., of the at least one lens included in the optical layer 213, the number of the multiple views provided for the user 250 and a distance between the adjacent views may be changed.

In this case, the views may correspond to positions in which the user 250 may see different aspects of the object included in the image 260 displayed through the electronic device 100. As a position of the user 250 corresponds to one of the plurality of views, the electronic device 100 may allow the user 250 to experience a 3D effect by providing the image 260 including different aspects of the object to the user 250.

For convenience of explanation, light that transmits through the base panel 211 is referred to as a base image displayed on the base panel 211, and light that transmits through the layer panel 212 is referred to as a layer image displayed on the layer panel 212. The base image may include information, such as transmissivity and colors of a plurality of pixels corresponding to the light that transmits through the base panel 211. The layer image may include information, such as transmissivity and colors of a plurality of pixels corresponding to the light that transmits through the layer panel 212.

In an embodiment, the base image included on the base panel 211 may include a plurality of sub-base images corresponding to a plurality of different views. Light coming out of each of the plurality of sub-base images may be refracted by the optical layer 213 and then provided onto the layer panel 212. Light coming out of each of the plurality of sub-base images may be refracted by the optical layer 213 into different paths and then provided onto the layer panel 212. The light provided to the layer panel 212 in different paths may be transmitted through different areas in the layer image, and then provided to the user 250 in the respective views.

Accordingly, the electronic device 100 may provide the image 260 that changes to correspond to a change in position of the user 250 to the user 250. The user 250 may experience a 3D effect of the object included in the image 260 based on the changing of the image 260 provided by the electronic device 100 in response to the change in position of the user 250.

In an embodiment, the image 260 provided by the electronic device 100 for the user 250 when the user 250 is positioned in the first direction that crosses a direction perpendicular to the front of the electronic device 100 may be different from the image 260 provided by the electronic device 100 for the user 250 when the user 250 is positioned in the second direction that crosses the direction perpendicular to the front of the electronic device 100 and that is different from the first direction.

In an embodiment, the electronic device 100 may provide the image 260 for the user 250 positioned in the first direction to feel as if looking at the object from the first direction. In an embodiment, the electronic device 100 may provide the image 260 for the user 250 positioned in the second direction to feel as if looking at the object from the second direction. Accordingly, the user 250 may experience the 3D effect of the object included in the image 260 displayed by the electronic device 100.

The disclosure is not, however, limited thereto, and at least one of the base panel 211 or the layer panel 212 may be a self-emitting display such as an organic light emitting diode (LED) display, an inorganic LED display, etc. When both the base panel 211 and the layer panel 212 are self-emitting panels, the display 210 may not include the backlight 214. In this case, the electronic device 100 may provide the user 250 with the image 260 different depending on the position of the user 250 by controlling transmissivity of each sub-panel, intensity and wavelength of the light generated by each panel.

Figure 3:
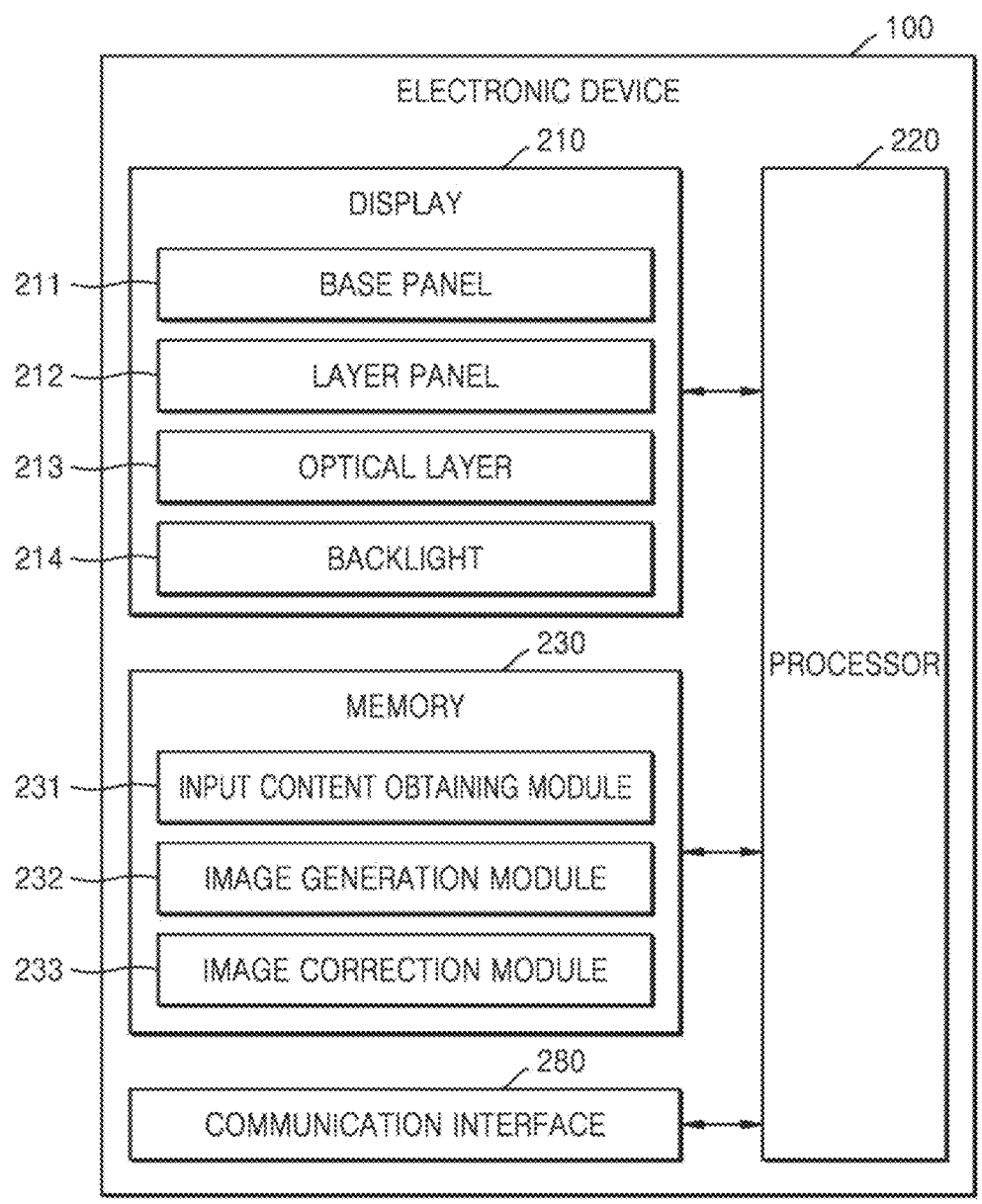
FIG. 3 is a block diagram for illustrating a configuration of an electronic device, according to an embodiment of the disclosure.

FIG. 3 is a block diagram for describing a configuration of an electronic device, according to an embodiment of the disclosure. Descriptions of an overlapping configuration with those of FIGS. 1 and 2 will not be repeated.

Referring to FIGS. 2 and 3, in an embodiment, the electronic device 100 may include the display 210, the memory 230, the at least one processor 220 and a communication interface 280. However, not all the components shown in FIG. 3 are essential. The electronic device 100 may be implemented with more or fewer components than in FIG. 3. The display 210, the memory 230, the at least one processor 220 and the communication interface 280 may be electrically and/or physically connected to one another.

In an embodiment, the display 210 may include one of a liquid crystal display, a plasma display, an organic LED display or an inorganic LED display. The disclosure is not, however, limited thereto, and the display 210 may include a different type of display that may provide the image 260 for the user 250.

In an embodiment, the display 210 may include the base panel 211, the layer panel 212, the optical layer 213 and the backlight 214. However, the display 210 may include more or fewer components than in FIG. 2. For example, the display 210 may include only the base panel 211 and the layer panel 212. Furthermore, the display 210 may include three or more panels in addition to the optical layer 213 and the backlight 214.

In an embodiment, the memory 230 may include at least one of a flash memory type, a hard disk type, a multimedia card micro type, a card type memory (e.g., secure digital (SD) or extreme digital (XD) memory), a random access memory (RAM), a static RAM (SRAM), a read-only memory (ROM), an electrically erasable programmable ROM (EEPROM), a programmable ROM (PROM), a mask ROM, a flash ROM, a hard disc drive (HDD) or a solid state drive (SSD). Instructions or program codes for performing functions or operations of the electronic device 100 may be stored in the memory 230. The instructions, algorithms, data structures, program codes and application programs stored in the memory 230 may be implemented in e.g., a programming or scripting language such as C, C++, Java, assembler, etc.

In an embodiment, various types of modules that may be used to provide the image 260 to the user 250 through the display 210 may be stored in the memory 230. An input content obtaining module 231, an image generation module 232 and an image correction module 233 may be stored in the memory 230. However, not all the modules shown in FIG. 3 are essential. The memory 230 may store more or fewer modules than in FIG. 3. In an embodiment, the memory 230 may further store a module for pre-processing the obtained input content.

The module included in the memory 230 may refer to a unit that processes a function or operation performed by the at least one processor 220. The modules included in the memory 230 may be implemented in software such as instructions, algorithms, data structures or program codes.

In an embodiment, the input content obtaining module 231 may be configured with instructions or program codes about an operation or function of obtaining the input content 240. The input content obtaining module 231 may be configured with instructions or program codes about an operation or function of receiving the input content 240 from an external server or nearby electronic devices. In an embodiment, the input content obtaining module 231 may be configured with instructions or program codes about an operation or function of obtaining the first frame image 240_1 in the first frame of the input content 240 and the second frame image 240_2 in the second frame.

In an embodiment, the image generation module 232 may be configured with instructions or program codes about an operation or function of generating a base image corresponding to the base panel 211 in the first frame and a layer image corresponding to the layer panel 212 in the first frame based on the obtained input content 240. In an embodiment, the layer image may be an image to be displayed on the layer panel 212 in the first frame.

In an embodiment, the image generation module 232 may be configured with instructions or program codes about an operation or function of generating a base image to be displayed on the base panel 211 and a layer image to be displayed on the layer panel 212 based on the input content 240. In an embodiment, the image generation module 232 may be configured with instructions or program codes about an operation or function of generating a base image and a layer image that make up the input content 240 by decomposing the input content 240.

In an embodiment, the image generation module 232 may be configured with instructions or program codes about an operation or function of generating a base image and a layer image that include a tensor that may represent the input content 240 by a multiplication between respective images by decomposing a tensor of the input content 240. For convenience of explanation, the decomposing of the input content 240 may be referred to as performing factorization on the input content 240.

In an embodiment, the image generation module 232 may be configured with instructions or program codes about an operation or function of generating a base image and a layer image by performing factorization. In an embodiment, the image generation module 232 may include a first artificial intelligence (AI) model that infers a base image and a layer image by performing factorization based on the input content 240. In an embodiment, the first AI model included in the image generation module 232 may include a machine learning or deep learning model.

In an embodiment, the first AI model included in the image generation module 232 may be an AI model trained to infer a base image corresponding to the base panel in the first frame and a layer image corresponding to the layer panel in the first frame based on the first frame image 240_1 and the second frame image 240-2.

In an embodiment, the electronic device 100 may train the first AI model included in the image generation module 232. The electronic device 100 may also do transfer learning using a pre-trained model to train the first AI model included in the image generation module 232. The disclosure is not, however, limited thereto, and the image generation module 232 may receive, from an external server or nearby electronic devices through the communication interface 280, the first AI model trained to infer the base image and the layer image in the first frame based on the first frame image 240_1 and the second frame image 2402 by performing factorization. Operation of the image generation module 232 and the training of the first AI model included in the image generation module 232 will be described later in connection with FIGS. 6 to 11.

In an embodiment, the image correction module 233 may be configured with instructions or program codes about an operation or function of generating a corrected base image based on a motion between the first frame image and the second frame image, based on the base image or the layer image. In an embodiment, the image correction module 233 may generate a corrected base image that reflects the motion between the first frame image and the second frame image and that is displayed on the base panel in the first frame, based on the base image or the layer image.

In an embodiment, when the display 210 includes the optical layer 213 and the base image includes a plurality of sub-base images corresponding to a plurality of different views, the image correction module 233 may be configured with instructions or program codes about an operation or function of generating a corrected base image based on a difference between the plurality of sub-base images and including a plurality of sub-corrected base images based on the base image or the layer image. In an embodiment, the image correction module 233 may generate a corrected base image that reflects the difference between a plurality of sub-base images and that is displayed on the base panel to correspond to the plurality of different views in the first frame, based on the base image or the layer image.

In an embodiment, the image correction module 233 may include a second AI model that infers a corrected base image based on the base image. In an embodiment, the second AI model included in the image correction module 233 may include a machine learning or deep learning model.

In an embodiment, the second AI model included in the image correction module 233 may be an AI model trained to infer a corrected base image to be displayed on the base panel in the first frame based on the base image.

In an embodiment, the electronic device 100 may train the second AI model included in the image correction module 233. The electronic device 100 may also do transfer learning using a pre-trained model to train the second AI model included in the image correction module 233. The disclosure is not, however, limited thereto, and the image correction module 233 may receive the second AI model trained to infer a corrected base image based on the base image from an external server or nearby electronic devices through the communication interface 280. Operation of the image correction module 233 and the training of the second AI model included in the image correction module 233 will be described later in connection with FIGS. 6 to 9, 12A and 12B.

In an embodiment, the first AI model included in the image generation module 232 and the second AI model included in the image correction module 233 may include a plurality of neural network layers. Each neural network layer may have a plurality of weight values, and may perform an operation of the present neural network layer based on an operation of the plurality of weight values and an operation result of the previous neural network layer. As an example of the AI model, there may be a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, a generative adversarial network (GAN), a variational auto encoder (VAE), or the like, but the first AI model and the second AI model in the disclosure are not limited to the example.

In an embodiment, the memory 230 may further store a preprocessing module configured with instructions or program codes about an operation or function of preprocessing the obtained input content 240. The preprocessing module may be configured with instructions or program codes about an operation or function of preprocessing the input content 240 by performing wrangling, transformation, integration, cleaning, reduction, discretization, etc. The image generation module 232 may generate the base image and the layer image based on the input content 240 preprocessed by the preprocessing module as well.

In an embodiment, the communication interface 280 may perform data communication with an external server under the control of the at least one processor 220. The communication interface 280 may perform data communication with not only the external server but also other nearby electronic devices. The communication interface 280 may perform data communication with the server or other nearby electronic devices by using at least one of data communication schemes including, for example, a wireless local area network (WLAN), Wi-Fi, Bluetooth, Zigbee, WFD, infrared data association (IrDA), Bluetooth low energy (BLE), near field communication (NFC), wireless broadband Internet (Wibro), world interoperability for microwave access (WiMAX), shared wireless access protocol (SWAP), wireless gigabit alliance (WiGig) and radio frequency (RF) communication.

In an embodiment, the at least one processor 220 may receive the input content 240 from the external server or nearby electronic devices through the communication interface 280. In an embodiment, the at least one processor 220 may transmit the generated corrected base image and the layer image to the external server or nearby electronic devices through the communication interface 280.

Figure 4:
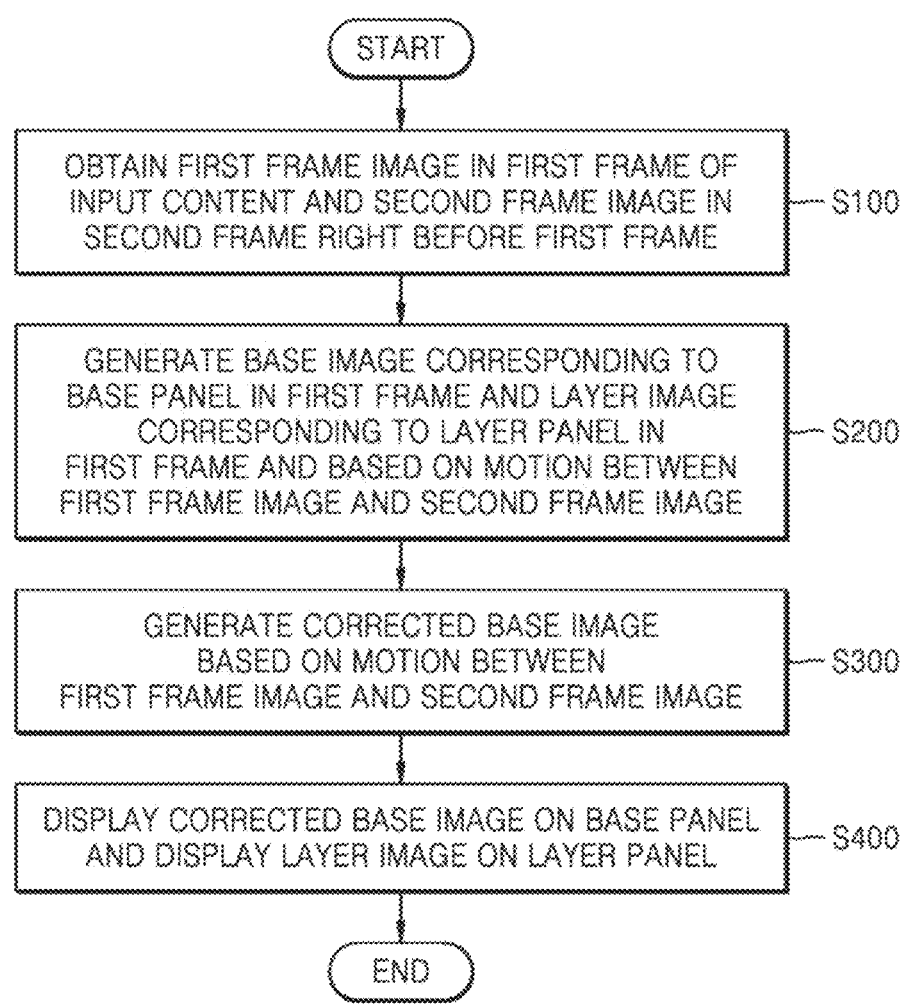
FIG. 4 is a flowchart for illustrating operation of an electronic device, according to an embodiment of the disclosure.

FIG. 4 is a flowchart for describing operation of an electronic device, according to an embodiment of the disclosure.

Referring to FIGS. 2, 3 and 4, in an embodiment, a method of operating the electronic device 100 may include obtaining the first frame image 240_1 in the first frame of the input content 240 and the second frame image 240_2 in the second frame, right before the first frame, in operation S100. The at least one processor 220 may run the input content obtaining module 231 to obtain the first frame image 240_1 and the second frame image 240_2.

In an embodiment, the method of operating the electronic device 100 may include generating a base image corresponding to the base panel 211 in the first frame and a layer image corresponding to the layer panel 212 in the first frame and based on a motion between the first frame image and the second frame image by applying the first frame image 240_1 and the second frame image 240_2 to the image generation module 232. In an embodiment, the at least one processor 220 may run the image generation module 232 to generate a base image corresponding to the base panel 211 in the first frame and a layer image corresponding to the layer panel 212 in the first frame and based on a motion between the first frame image and the second frame image, based on the first frame image 240_1 and the second frame image 240_2. The base image and the layer image will be described later in detail in connection with FIGS. 6 to 8.

In an embodiment, the method of operating the electronic device 100 may include generating a corrected base image based on a motion between the first frame image and the second frame image by applying the base image or the layer image to the image correction module 233. The at least one processor 220 may run the image correction module 233 to generate a corrected base image based on the motion between the first frame image and the second frame image based on the base image or the layer image.

In an embodiment, in operation S300 of generating the corrected base image, the corrected base image may be generated by applying the first frame image and the layer image to the image correction module 233. The at least one processor 220 may run the image correction module 233 to generate the corrected base image based on the first frame image and the layer image.

In an embodiment, in operation S300 of generating the corrected base image, the corrected base image may be generated based on the base image. Also, the at least one processor 220 may run the image correction module 233 to generate the corrected base image based on the base image. The corrected base image will be described later in detail in connection with FIGS. 6 to 8.

In an embodiment, the method of operating the electronic device 100 may include displaying the corrected base image on the base panel 211 and displaying the layer image on the layer panel 212 in operation S400. The at least one processor 220 may control the base panel 211 to display the corrected base image and control the layer panel 212 to display the layer image.

Figure 5:
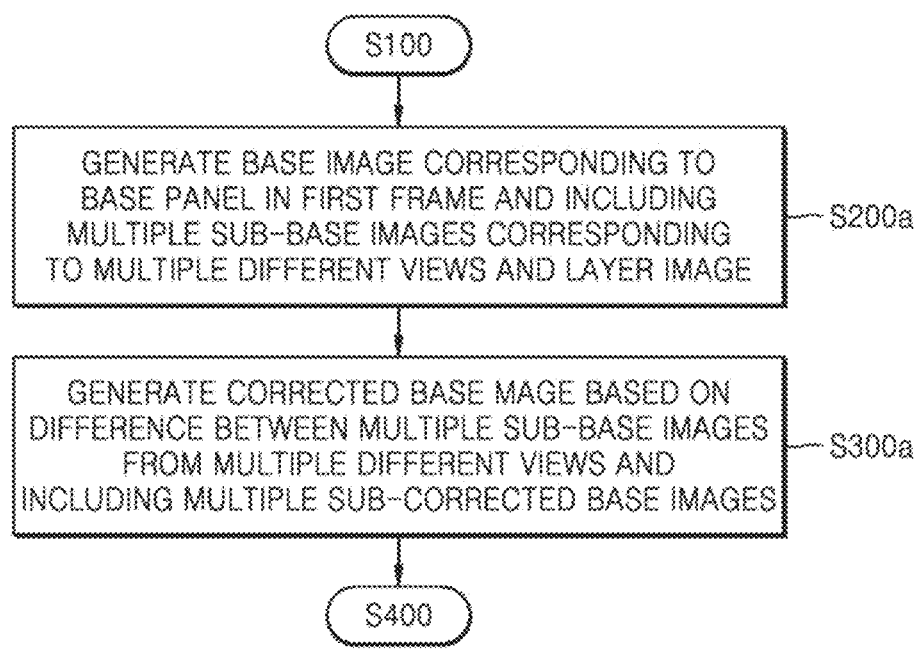
FIG. 5 is a flowchart for illustrating operation of an electronic device including an optical layer, according to an embodiment of the disclosure.

FIG. 5 is a flowchart for describing operation of an electronic device including an optical layer, according to an embodiment of the disclosure. The same operation as described in FIG. 4 will be given the same reference numeral but the description thereof will not be repeated.

Referring to FIGS. 2, 3 and 5, when the electronic device 100 further includes the optical layer 213 arranged between the base panel 211 and the layer panel 212, the base image may include a plurality of sub-base images corresponding to a plurality of different views, respectively. Each of the plurality of sub-base images provided through the base panel 211 may be refracted by the optical layer 213 to a different direction and provided onto the layer panel 212.

In an embodiment, in operation S200a of generating the base image and the layer image, a base image corresponding to the base panel 211 in the first frame and including a plurality of sub-base images corresponding to the plurality of different views, respectively, and a layer image may be generated by applying the first frame image and the second frame image to the image generation module 232. The at least one processor 220 may run the image generation module 232 to generate a base image corresponding to the base panel 211 in the first frame and including a plurality of sub-base images corresponding to the plurality of different views, respectively, and a layer image corresponding to the layer panel 212 in the first frame, based on the first frame image and the second frame image.

In an embodiment, in operation S300a of generating the corrected base image, the corrected base image based on a difference between the plurality of sub-base images from the plurality of different views and including a plurality of sub-corrected base images may be generated by applying the base image and the layer image to the image correction module 233. The at least one processor 220 may run the image correction module 233 to generate the corrected base image based on a difference between the plurality of sub-base images from the plurality of different views and including a plurality of sub-corrected base images, based on the base image and the layer image. The base image and the corrected base image when the electronic device 100 includes the optical layer 213 will be described later in connection with FIGS. 7 and 8.

Figure 6:
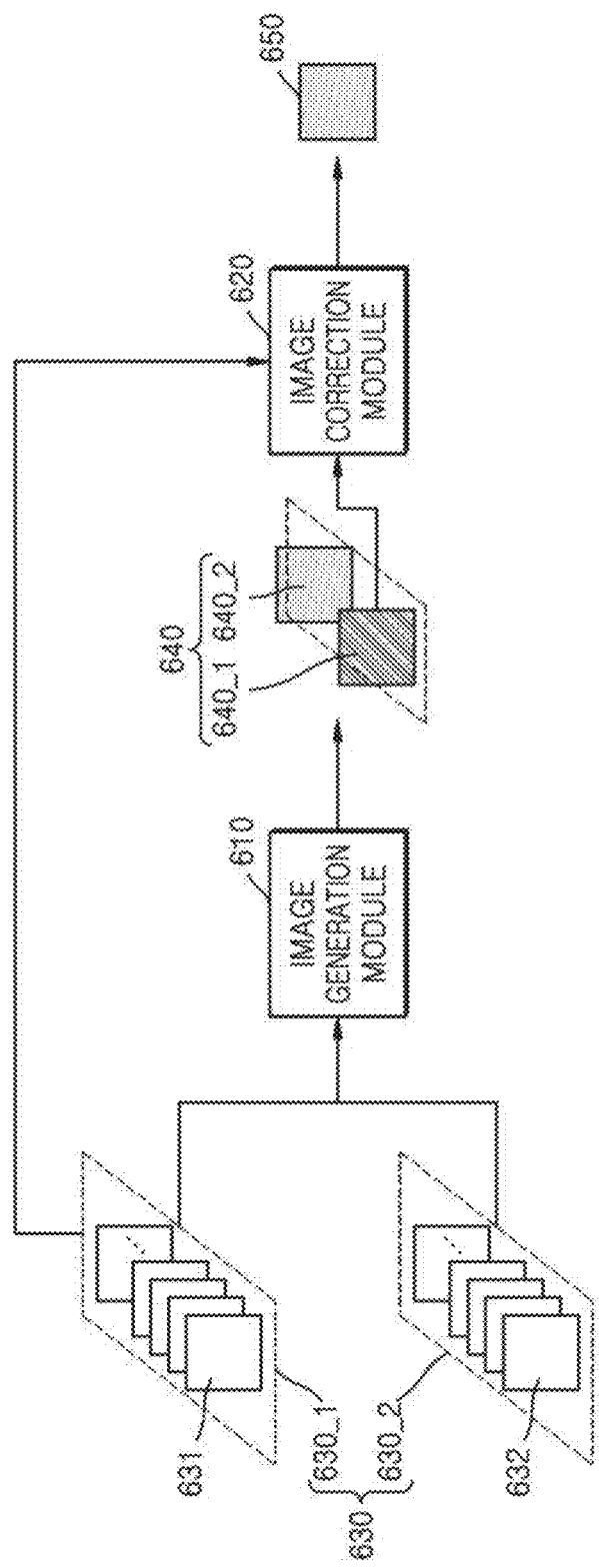
FIG. 6 is a diagram for illustrating operation of an electronic device for generating a layer image and a corrected base image, according to an embodiment of the disclosure.
Figure 7:
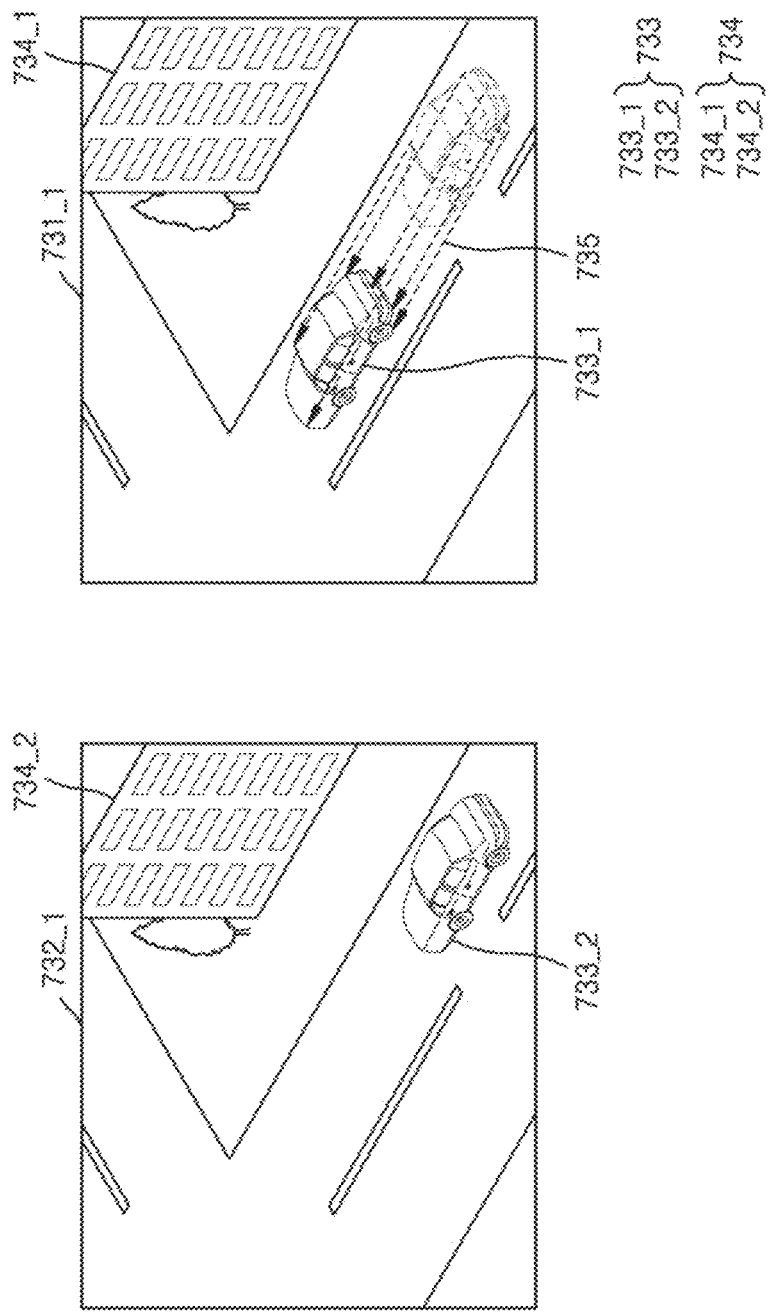
FIG. 7 is a diagram for illustrating a motion between a first frame image and a second frame image, according to an embodiment of the disclosure.

FIG. 6 is a diagram for describing operation of an electronic device for generating a layer image and a corrected base image, according to an embodiment of the disclosure. FIG. 7 is a diagram for describing a motion between a first frame image and a second frame image, according to an embodiment of the disclosure. Descriptions of an overlapping configuration with that of FIG. 3 will not be repeated.

FIG. 6 is a diagram for describing operation of the electronic device 100 including the base panel 211 and the layer panel 212. In this case, the electronic device 100 may further include the backlight 214 for providing light to the base panel 211 and the layer panel 212.

Referring to FIGS. 3, 4 and 6, in an embodiment, the at least one processor 220 may obtain an input content 630. The input content 630 may include a first frame image 6301 in the first frame of the input content 630 and a second frame image 630_2 in the second frame right before the first frame of the input content 630. The first frame image 630_1 may include a plurality of view images 631 obtained from a plurality of different views. The second frame image 6302 may include a plurality of view images 632 obtained from a plurality of different views.

In an embodiment, the input content 630 may include information about an object that is moving during the plurality of frames. The disclosure is not, however, limited thereto, and the input content 630 may include information about an object whose shape or size or a portion of which is changing (e.g., a person's face expression is changing) during the plurality of frames. Hence, among the plurality of frames included in the input content, the information included in the first frame image in the first frame may be different from the information included in the second frame image in a second frame right before the first frame.

Referring to FIGS. 6 and 7, a first frame image 731_1 and a second frame image 732_1 are shown in FIG. 7. The first frame image 7311 and the second frame image 732_1 each include a first object 733_1 or 733_2 and a second object 734_1 or 734_2.

In an embodiment, the first object 733 included in the input content 630 may be an object in motion during the plurality of frames. The second object 734 included in the input content 630 may be an object that is motionless during the plurality of frames. Hence, a location of the first object 733_1 included in the first frame image 731_1 may be different from a location of the first object 7332 included in the second frame image 732_1. A location of the second object 734_1 included in the first frame image 731_1 may be the same as a location of the second object 734_2 included in the second frame image 732_1.

In an embodiment, a motion 735 between the first frame image 731_1 and the second frame image 732_1 may be calculated by comparing the first frame image 731_1 and the second frame image 7321. The motion 735 between the first frame image 731_1 and the second frame image 732_1 may refer to an optical flow calculated based on the successive frames, the first frame image 731_1 and the second frame image 732_2.

In an embodiment, the motion 735 between the first frame image 731_1 and the second frame image 732_1 may include information about a motion between the first object 733_1 included in the first frame image 7311 and the first object 733_2 included in the second frame image 732_1. The motion 735 between the first frame image 731_1 and the second frame image 7321 may include information about a direction and a distance which the first object 733 moves from a previous frame, the second frame to the first frame. A method of calculating the motion 735 between the first frame image 7311 and the second frame image 7321 will be described later in connection with FIG. 12A.

In an embodiment, the at least one processor 220 may generate a panel image 640 corresponding to the display 210 by applying the first frame image 630_1 and the second frame image 630_2 to the image generation module 610. In a case that the base panel 211 and the layer panel 212 are included in the display 210, a base image 640_2 corresponding to the base panel 211 and a layer image 640_1 corresponding to the layer panel 212 may be generated by applying the first frame image 630_1 and the second frame image 630_2 to the image generation module 610.

In an embodiment, the base image 640_2 and the layer image 640_1 are images that are displayed on the base panel 211 and the layer panel 212, respectively, to represent an object included in the input content 630 with a combination of the base image 640_2 and the layer image 640_1, thereby providing the image 260 (see FIG. 2) having a 3D effect to the user 250 (see FIG. 2).

In an embodiment, in a case that both the base panel 211 and the layer panel 212 are non-self-emitting displays such as a liquid crystal display, the image 260 obtained by combining the base image 6402 and the layer image 6401 may be provided for the user 250.

In an embodiment, in a case that the layer panel 212 is a self-emitting display such as an OLED display, inorganic LED display, etc., the image 260 obtained by multiplying the base image 640_2 and the layer image 640_1 may be provided for the user 250.

In an embodiment, the image generation module 610 may include a first AI model trained to infer the base image 640_2 and the layer image 640_1 based on the first frame image 630_1 and the second frame image 630_2.

In an embodiment, the first AI model may be an AI model trained to infer the base image 640_2 corresponding to the base panel 211 in the first frame and the layer image 640_1 corresponding to the layer panel 212 in the first frame and based on the motion 735 between the first frame image 630_1 and the second frame image 630_2, based on the first frame image 630_1 and the second frame image 630_2.

In an embodiment, the first AI model may be a model trained to infer the layer image 640_1 that reflects the motion 735 between the first frame image 630_1 and the second frame image 630_2, based on the first frame image 630_1 and the second frame image 630_2.

In an embodiment, the object included in the first frame image 630_1 and the object included in the second frame image 630_2 are each represented as an image by a combination of the base image and the layer image. When the location of the object included in the first frame image 6301 is different from the location of the object included in the second frame image 630_2, a base image generated based on the first frame image 630_1 in the first frame may also be different from a base image generated based on the second frame image 630_2 in the second frame.

In this case, as the base image in the first frame and the base image in the second frame are generated without reflecting a motion from the second frame to the first frame but only based on the first frame image 630_1 and the second frame image 630_2, respectively, not only the position information of the objects included in the base image in the first frame and the base image in the second frame but also information such as luminance, gray scale, color, etc., of the objects may be different.

Furthermore, the layer image in the first frame generated based on the first frame image 6301 and the layer image in the second frame generated based on the second frame image 630_2 may also be generated to correspond to the base image in the first frame and the base image in the second frame, respectively. Hence, not only the position information of the object included in each of the layer images in the first frame and the second frame but also such information as luminance, gray scale, color, etc., of the object may be different.

In an embodiment, in a case that at least one information of luminance, gray scale or color of the object included in the layer image and the base image in the first frame is different from at least one information of luminance, gray scale or color of the object included in the layer image and the base image in the second frame, the change in at least one of luminance, gray scale or color of the object apart from the motion of the object included in the image 260 during the first frame from the second frame may make a flicker visible to the user 250. Hence, visibility for the user 250 and quality of the image 260 may be lowered.

In the disclosure, the image generation module 610 including the first AI model trained to infer the layer image 640_1 in the first frame by reflecting the motion 735 between the first frame image 630_1 and the second frame image 630_2 may generate a layer image in the first frame that has a difference only in the position information of the object but has little difference in the information such as luminance, gray scale, color, etc., of the object from the layer image in the second frame by comparing with the layer image in the second frame when the position of the object included in the first frame image 6301 is different from the position of the object included in the second frame image 6302. A method of training the first AI model will be described later in connection with FIGS. 11 to 12B.

In an embodiment, the image correction module 620 may include instructions or program codes for performing an operation or function of generating a corrected base image 650 according to the first frame image 630_1 and the layer image 640-1.

In an embodiment, the image correction module 620 may include instructions or program codes for performing an operation or function of generating the corrected base image 650 according to the first frame image 630_1 and the layer image 640_1 based on the display type of the base panel 211 and the layer panel 212.

In an embodiment, the first frame image 630_1 may be an image corresponding to the image 260 generated by the electronic device 100 according to a combination of the corrected base image 650 displayed on the base panel 211 and the layer image 640_1 displayed on the layer panel 212 and provided for the user 250.

In an embodiment, in a case that both the base panel 211 and the layer panel 212 are non-self-emitting displays such as the liquid crystal display, the image correction module 620 may include instructions or program codes for performing an operation or function of generating the corrected base image 650 based on a difference between the first frame image 630_1 and the layer image 640_1.

In an embodiment, in a case that the layer panel 212 is a self-emitting display such as an organic LED display, an inorganic LED display, etc., the image correction module 620 may include instructions or program codes for performing an operation or function of generating the base image 650 by separating the layer image 640_1 from the first frame image 630_1.

In an embodiment, the at least one processor 220 may generate the corrected base image 650 based on the motion between the first frame image 630_1 and the second frame image 630_2 by applying the layer image 640_1 and the first frame image 630_1 to the image correction module 620. The corrected base image 650 may be an image corresponding to the base panel 211 in the first frame.

In an embodiment, the at least one processor 220 may display the corrected base image 650 on the base panel 211 and display the layer image 640_1 on the layer panel 212 to improve visibility to the user 250 and quality of the image 260 by providing the user 250 with the image 260 having different position information of the object but same luminance, gray scale, color, etc., of the object in the first frame as compared with the second frame even when the input content 630 including the moving object during the first frame from the second frame is provided.

Figure 8:
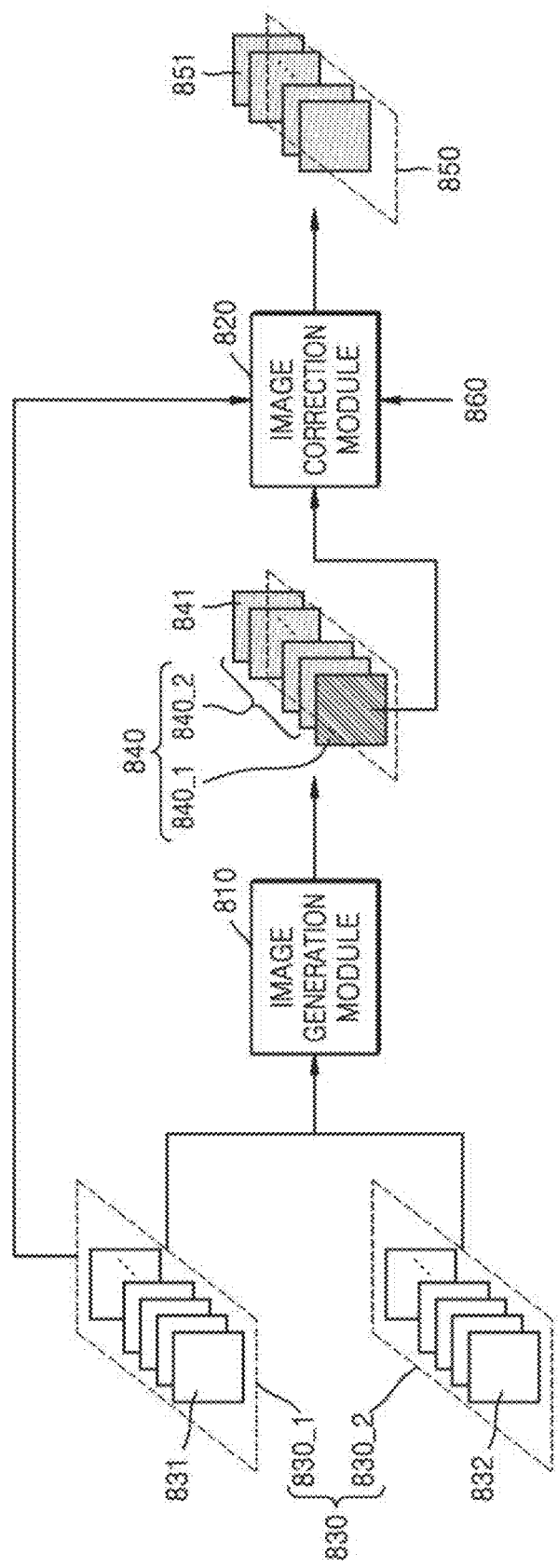
FIG. 8 is a diagram for illustrating operation of an electronic device for generating a layer image and a corrected base image including a plurality of sub-corrected base images, according to an embodiment of the disclosure.
Figure 9:
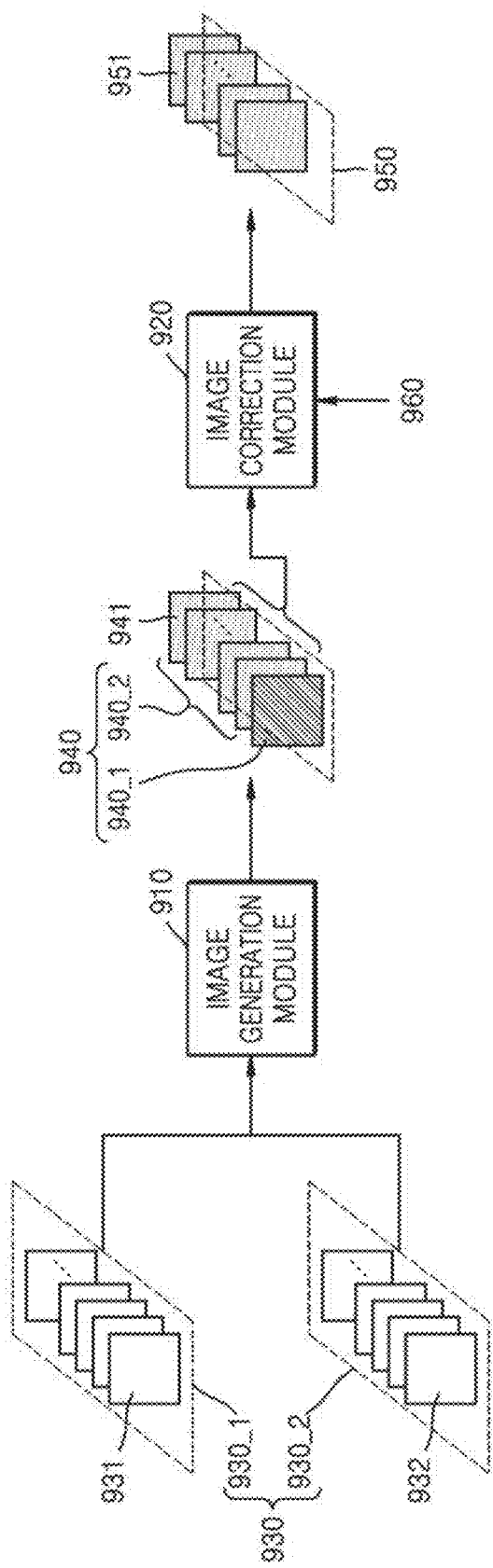
FIG. 9 is a diagram for illustrating operation of an electronic device for generating a corrected base image through an image correction module including a second artificial intelligence (AI) model, according to an embodiment of the disclosure.
Figure 10:
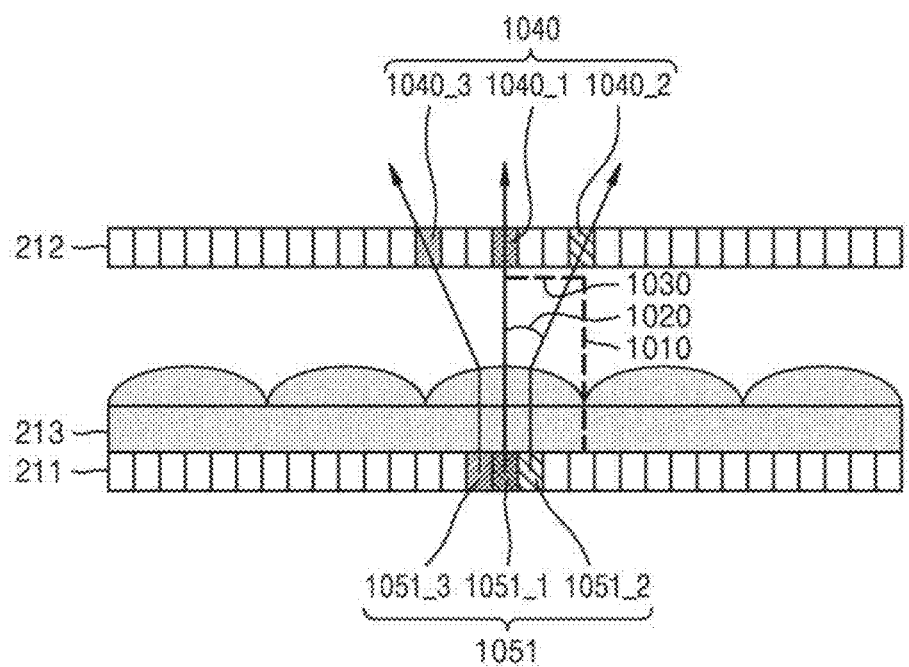
FIG. 10 is a diagram for illustrating a shift value, according to an embodiment of the disclosure.

FIG. 8 is a diagram for describing operation of an electronic device for generating a layer image and a corrected base image including a plurality of sub-corrected base images, according to an embodiment of the disclosure. FIG. 9 is a diagram for describing operation of an electronic device for generating a corrected base image through an image correction module including a second AI model, according to an embodiment of the disclosure. FIG. 10 is a diagram for describing a shift value, according to an embodiment of the disclosure. Descriptions of an overlapping configuration with those of FIGS. 3 and 6 will not be repeated.

Referring to FIGS. 2 and 8, FIG. 8 is a diagram for describing operation of the electronic device 100 when the electronic device 100 includes the base panel 211, the layer panel 212 and the optical layer 213 arranged between the base panel 211 and the layer panel 212. In this case, the electronic device 100 may further include the backlight 214 for providing light to the base panel 211 and the layer panel 212.

Referring to FIGS. 3, 4, 6 and 8, in an embodiment, the at least one processor 220 may obtain an input content 830. The input content 830 may include a first frame image 8301 in the first frame of the input content 830 and a second frame image 830_2 in the second frame of the input content 830. The first frame image 830_1 may include a plurality of view images 831 obtained from a plurality of different views. The second frame image 830_2 may include a plurality of view images 832 obtained from a plurality of different views.

In an embodiment, the at least one processor 220 may generate a panel image 840 corresponding to the display 210 by applying the first frame image 830_1 and the second frame image 830_2 to an image generating module 810. The at least one processor 220 may generate a base image 840_2 corresponding to the base panel 211 and a layer image 840_1 corresponding to the layer panel 212 by applying the first frame image 830_1 and the second frame image 830_2 to the image generation module 810.

In an embodiment, the at least one processor 220 may further apply information about the base panel 211, the layer panel 212 and the optical layer 213 included in the display 210 to the image generation module 810. In this case, the at least one processor 220 may refer to the information about the base panel 211, the layer panel 212 and the optical layer 213 to generate the base image 840_2 and the layer image 840_1 based on the first frame image 830_1 and the second frame image 830_2.

In an embodiment, the information about the base panel 211 may include information about at least one of a resolution of the base panel 211, a display type or brightness. The information about the layer panel 212 may include information about at least one of a resolution of the layer panel 212, a display type or brightness. The information about the optical layer 213 may include information about at least one of the number of at least one lens included in the optical layer 213, the size of the at least one lens or a refraction index of the at least one lens.

In an embodiment, the base image 840_2 may include a plurality of sub-base images 841 corresponding to the plurality of different views, respectively. Each of the plurality of sub-base images 841 may be refracted by the optical layer 213, transmitted through different areas in the layer image 840_1 displayed on the layer panel 212, and provided for the user 250 located in a view corresponding to the refracted path. In an embodiment, the plurality of sub-base images 841 are base images for providing the image 260 including different aspects of an object for the user 250 from different views.

In an embodiment, as the plurality of sub-base images 841 are base images for providing the image 260 including different aspects of the object from different views, the position information of the object included in each of the plurality of sub-base images 841 may be different. Such information as luminance, gray scale, color, etc., of the object included in each of the plurality of sub-base images 841 may also be different. Hence, when the base image 840_2 including the plurality of sub-base images 841 is displayed on the base panel 211, at least one of luminance, gray scale or color of the object is changed according to a change in view, so a flicker may be visible to the user 250. Hence, visibility for the user 250 and quality of the image 260 may be lowered.

In an embodiment, the image generation module 232 may include a first AI model trained to infer the base image 840_2 including the plurality of sub-base images 841 and the layer image 840_1 based on the first frame image 830_1 and the second frame image 830_2.

In an embodiment, the first AI model may be an AI model trained to infer the base image 840_2 corresponding to the base panel 211 in the first frame and including the plurality of sub-base images 841 and the layer image 840_1 corresponding to the layer panel 212 in the first frame and based on the motion 735 (see FIG. 7) between the first frame image 830_1 and the second frame image 830_2, based on the first frame image 830_1 and the second frame image 830_2.

In an embodiment, the image correction module 620 may include instructions or program codes for performing an operation or function of generating a plurality of shifted layer images by shifting the layer image 840_1 with the use of each of a plurality of shift values 860, and generating a corrected base image 850 including a plurality of sub-corrected base images 851 according to the first frame image 830_1 and the plurality of shifted layer images.

In an embodiment, the image correction module 620 may include instructions or program codes for performing an operation or function of generating the corrected base image 850 including the plurality of sub-corrected base images 851 according to each of the plurality of view images 831 included in the first frame image 830_1 and the plurality of shifted layer images shifted to correspond to the plurality of view images 831, respectively.

In an embodiment, the image correction module 820 may include instructions or program codes for performing an operation or function of generating the corrected base image 850 according to the plurality of view images 831 and the plurality of shifted layer images based on the display type of the base panel 211 and the layer panel 212.

In an embodiment, in a case that both the base panel 211 and the layer panel 212 are non-self-emitting displays such as the liquid crystal display, the image correction module 820 may include instructions or program codes for performing an operation or function of generating the corrected base image 850 including the plurality of sub-corrected base images 851 according to a difference between each of the plurality of view images 831 and a corresponding shifted layer image.

In an embodiment, in a case that the layer panel 212 is a self-emitting display such as an OLED display, an inorganic LED display, etc., the image correction module 820 may include instructions or program codes for performing an operation or function of generating the corrected base image 850 including the plurality of sub-corrected base images 851 by separating each of the plurality of view images 831 from the corresponding shifted layer image.

Referring to FIG. 10, shown are the base panel 211, the optical layer 213 and the layer panel 212 included in the display 210. In an embodiment, the optical layer 213 may be arranged on the base panel 211. The layer panel 212 may be arranged on the optical layer 213. In an embodiment, the display 210 may further include the backlight 214 arranged underneath the base panel 211.

In an embodiment, the base panel 211 and the layer panel 212 may be spaced from each other and included in the display 210. In an embodiment, the layer panel 212 is located to be spaced from the base panel 211, and the distance between the layer panel 212 and the base panel 211 is defined as a reference distance 1010. In an embodiment, the reference distance 1010 may be a distance between the upper surface of the base panel 211 and the lower surface of the layer panel 212.

In an embodiment, the base panel 211 and the layer panel 212 may each include a plurality of pixels. In an embodiment, the light provided from the backlight may be transmitted through one of the plurality of pixels included in the base panel 211 and one of the plurality of pixels included in the layer panel 212 and provided to the user 250 (see FIG. 2).

In an embodiment, an extent to which the light transmitted through the base panel 211 is refracted by the optical layer 213 may be determined based on at least one of the size of the at least one lens included in the optical layer 213, the shape of the lens or the refraction index of the lens. The light transmitted through the base panel 211 has a changing path by being refracted by the optical layer 213, transmitted through the layer panel 212 and provided to the user 250.

In an embodiment, a base image 1051 displayed on the base panel 211 may include a first sub-base image 1051_1, a second sub-base image 10512 and a third sub-base image 1051_3.

In an embodiment, each of the first to third sub-base images 1051_1, 1051_2 and 1051_3 may be refracted by the optical layer 213 and provided to the user 250 located in a different view. Each of the first to third sub-base images 1051_1, 1051_2 and 1051_3 may be an image for providing a different aspect of an object for the user 250 located in a different view.

In an embodiment, the second sub-base image 1051_2 and the third sub-base image 1051_3 are adjacent to the first sub-base image 1051_1. A view where the user for which the image 260 is provided based on the first sub-base image 1051_1 is located may be adjacent to a view where the user for which the image 260 is provided based on the second sub-base image 1051_2 is located. A view where the user for which the image 260 is provided based on the first sub-base image 1051_1 is located may be adjacent to a view where the user for which the image 260 is provided based on the third sub-base image 1051_3 is located.

Although the base image 1051 is shown as including three sub-base images in FIG. 10, the disclosure is not limited thereto. Based on at least one of the resolution of the base panel 211, the size of the at least one lens included in the optical layer 213, the shape of the lens or the refraction index of the lens, the base image 1051 may include two sub-base images or four or more sub-base images.

In an embodiment, each of the first to third base images 1051_1, 1051_2 and 1051_3 may be refracted by the optical layer 213, transmitted through an area in the corresponding light path in the layer image 1040, and provided to the user 250.

In an embodiment, in the layer image 1040, an area through which the first sub-base image 1051_1 incident at a right angle on the lens included in the optical layer 213 and directed toward the front of the layer panel 212 without being refracted is transmitted may be defined as a first layer area 1040_1. In the layer image 1040, an area through which the second sub-base image 1051_2 adjacent to the first sub-base image 1051_1 is transmitted after being refracted by the optical layer 213 may be defined as a second layer area 1040_2. In the layer image 1040, an area through which the third sub-base image 1051_3 adjacent to the first sub-base image 1051_1 is transmitted after being refracted by the optical layer 213 may be defined as a third layer area 1040_3.

In an embodiment, a distance between the pixels of the first layer area 1040_1 and the second layer area 10402 through which the adjacent first sub-base image 1051_1 and second sub-base image 1051_2 are transmitted after being refracted by the optical layer 213 may be defined as a reference shift value 1030.

In an embodiment, the reference shift value 1030 may be determined based on at least one of a distance between adjacent views among the plurality of views from which the user 250 may look at different aspects of the object included in the image 260 displayed through the electronic device 100, the reference distance 1010 or a resolution of the layer panel 212. In an embodiment, the longer the reference distance 1010, the larger the reference shift value 1030. The higher the resolution of the layer panel 212, the larger the reference shift value 1030. The larger the distance between the adjacent views, the larger the reference shift value 1030.

In an embodiment, the plurality of shift values 860 (see FIG. 8) may be determined based on the reference shift value 1030 and the plurality of different views. Assuming that there are N+1 views from which the user 250 is able to look at different aspects of an object included in the image 260 displayed through the electronic device 100, $$\frac{N}{2}$$

views to the left of the electronic device 100 and $$\frac{N}{2}$$

views to the right of the electronic device 100 may be included based on the user 250 being located in the view from which the image 260 may be seen from the front of the electronic device 100.

In an embodiment, assuming that the reference shift value 1030 is s, the plurality of shift values 860 corresponding to the plurality of different views may have a value of 0 or $$-\frac{N}{2} \times S \text{ to } \frac{N}{2} \times S.$$

In this case, N is a natural number, and 0 may be a shift value when the user 250 is located in the view from which the image 260 may be seen from the front of the electronic device 100.

In an embodiment, the plurality of shift values 860 may include information about the plurality of different views, respectively. The plurality of shifted layer images generated by shifting the layer image 840-1 with the use of the plurality of shift values 860 may include information about layer images provided to the user 250 from the plurality of different views.

Turning back to FIG. 8, in an embodiment, the at least one processor 220 may generate the corrected base image 850 based on the motion between the first frame image 830_1 and the second frame image 830_2 by applying the layer image 840_1, the first frame image 830_1 and the plurality of shift values 860 to the image correction module 820. The corrected base image 850 may be an image corresponding to the base panel 211 in the first frame.

In an embodiment, the at least one processor 220 may generate the corrected base image 850 based on a difference between the plurality of sub-base images 841 from the plurality of different views and including the plurality of sub-corrected base images 851, according to the plurality of view images 831 included in the first frame image 830_1 and a shifted layer image shifted by a shift value among the plurality of shift values 860 corresponding to each view of the plurality of view images 831.

In an embodiment, each of the plurality of sub-corrected base images 851 obtained based on the plurality of view images 831 including an object represented for the user 250 in the respective views and a plurality of shifted layer images shifted according to shift values corresponding to the respective views may have different position information of the object due to different views and the same information such as luminance, gray scale, color, etc., of the object as compared with adjacent sub-corrected base images.

In an embodiment, the at least one processor 220 may display the corrected base image 850 on the base panel 211 and display the layer image 840_1 on the layer panel 212 to improve visibility to the user 250 and quality of the image 260 by providing the user 250 with the image 260 having different position information of the object but same luminance, gray scale, color, etc., of the object in the first frame as compared with the second frame even when the input content 830 including the moving object during the first frame from the second frame is provided.

Furthermore, even when the corrected base image 850 including the plurality of sub-corrected base images 851 is displayed on the base panel 211 to provide the user 250 with the image 260 including different aspects of the object from different views, the image 260 having different position information of the object due to the change in view and the same luminance, gray scale, color, etc., of the object is provided for the user 250, thereby improving visibility to the user 250 and quality of the image 260.

Referring to FIG. 9, shown is a configuration of an image correction module 920 including a second AI model trained to infer a corrected base image 950 based on a base image 940_2 and a plurality of shift values 960. Descriptions of an overlapping configuration with that of FIG. 8 will not be repeated.

In an embodiment, the at least one processor 220 may generate a base image 940_2 corresponding to the base panel 211 and including a plurality of sub-base images 941 and a layer image 940_1 corresponding to the layer panel 212 by applying a first frame image 930_1 and a second frame image 930_2 to an image generation module 910.

In an embodiment, the at least one processor 220 may generate a corrected base image 950 including a plurality of sub-corrected base images 951 by applying the base image 940_2 including the plurality of sub-base images 941 and the plurality of shift values 960 to the image correction module 920.

In an embodiment, the second AI model may be an AI model trained to infer the corrected base image 950 corresponding to the base panel 211 in the first frame and including the plurality of sub-corrected base images 951 corresponding to a plurality of different views, respectively, based on the base image 940_2 including the plurality of sub-base images 941 and the plurality of shift values 960.

In an embodiment, the second AI model may be an AI model trained to infer the corrected base image 950 including the plurality of sub-corrected base images 951 based on the difference between the plurality of sub-base images 941 from the plurality of different views, according to the plurality of sub-base images 941 corresponding to the plurality of different views and the plurality of shift values 960 corresponding to the plurality of different views. A method of training the second AI model will be described later in connection with FIG. 12C.

In an embodiment, the at least one processor 220 may display the corrected base image 950 on the base panel 211 and display the layer image 940_1 on the layer panel 212.

Figure 11:
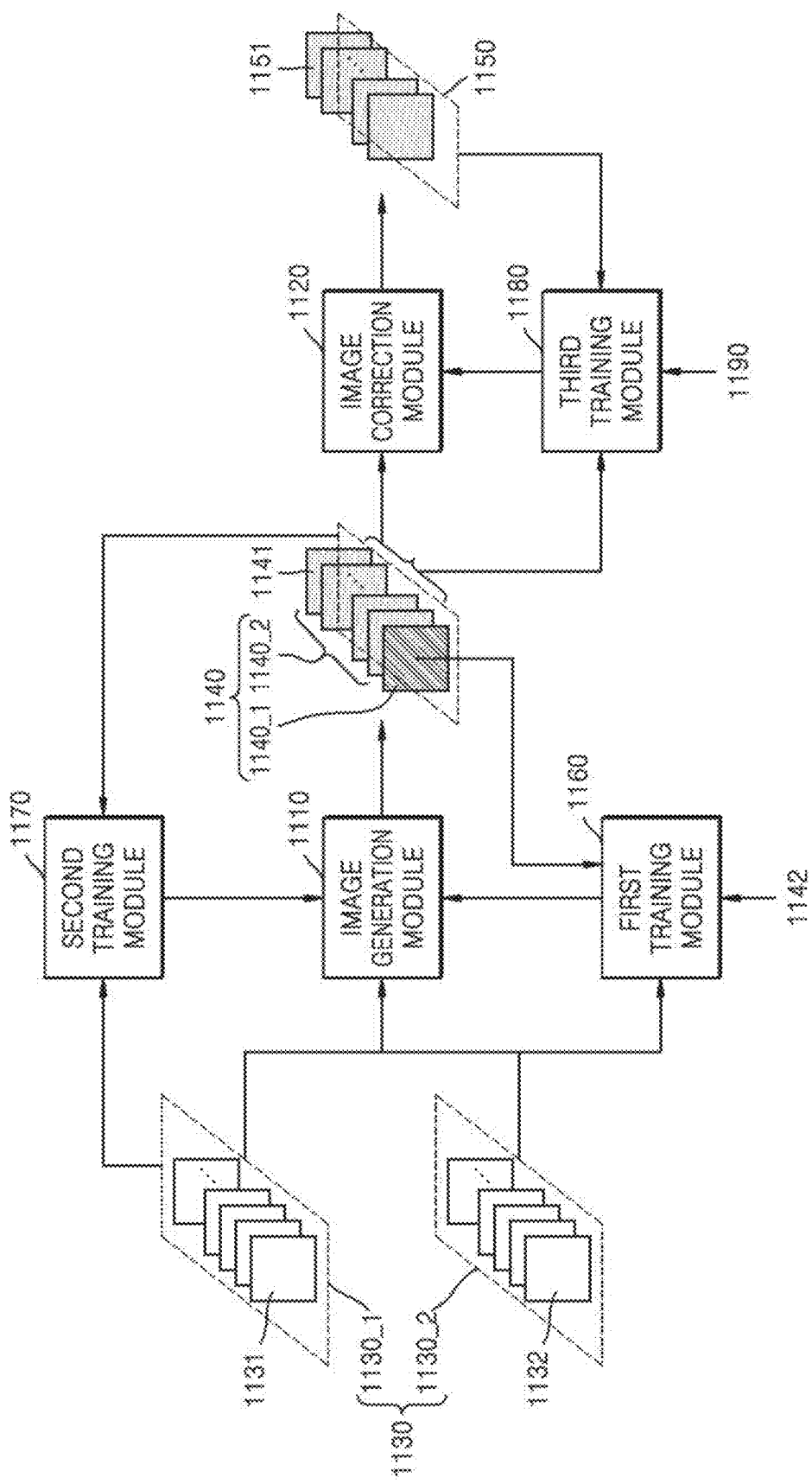
FIG. 11 is a diagram for illustrating a procedure for training a first AI model included in an image generation module and a second AI model included in an image correction module, according to an embodiment of the disclosure.

FIG. 11 is a diagram for describing a procedure for training a first AI model included in an image generation module and a second AI model included in an image correction module, according to an embodiment of the disclosure. Descriptions of an overlapping configuration with those of FIGS. 6, 8 and 9 will not be repeated.

Referring to FIGS. 2 and 11, FIG. 11 is a diagram for describing operation of the electronic device 100 when the electronic device 100 includes the base panel 211, the layer panel 212 and the optical layer 213 arranged between the base panel 211 and the layer panel 212. In this case, the electronic device 100 may further include the backlight 214 for providing light to the base panel 211 and the layer panel 212.

In an embodiment, the image generation module 1110 included in the electronic device 100 may include the first AI model, and the image correction module 1120 may include the second AI model.

In an embodiment, the electronic device 100 may train the first AI model included in the image generation module 1110 and the second AI model included in the image correction module 1120, as shown in FIG. 11. The disclosure is not, however, limited thereto, and a nearby electronic device may train the AI model as shown in FIG. 11 and the electronic device 100 may receive the trained AI model from the nearby electronic device. Furthermore, the electronic device 100 may receive a pre-trained AI model from the nearby electronic device for transfer learning and do the transfer training based on what is shown in FIG. 11. For convenience explanation, it is assumed that the electronic device 100 trains the first AI model included in the image generation module 1110 and the second AI model included in the image correction module 1120.

In an embodiment, the electronic device 100 may obtain an input content for training 1130. The electronic device 100 may obtain a first frame image for training 1130_1 in the first frame of the input content for training 1130 and a second frame image for training 1130_2 in the second frame.

In an embodiment, the first AI model included in the image generation module 1110 may be trained to infer a base image for training 1140_2 corresponding to the base panel 211 in the first frame and including a plurality of sub-base images for training 1141 and a layer image 1140_1 corresponding to the layer panel 212 in the first frame and reflecting the motion 753 (see FIG. 7) between the first frame image for training 1130_1 and the second frame image for training 1130_2, based on the first frame image for training 1130_1 including a plurality of view images for training 1131 and the second frame image for training 1130_2 including a plurality of view images for training 1132.

In an embodiment, the at least one processor 220 may run a first training module 1160 to train the first AI model to extract the motion 753 between the first frame image for training 1130_1 and the second frame image for training 1130_2, warp an already-generated comparison layer image 1142 corresponding to the layer panel 212 in the second frame based on the extracted motion 753, and infer the layer image for training 1140_1 having little difference from the warped comparison layer image. Training of the first AI model by the first training module 1160 will be described later in connection with FIG. 12A.

In an embodiment, to provide the image 260 that represents the first frame image for training 1130_1 to the user 250, the at least one processor 220 may run a second training module 1170 to train the first AI model to infer the base image for training 1140_2 corresponding to the base panel 211 in the first frame and the layer image for training 1140_1 corresponding to the layer panel 212 in the first frame based on the first frame image for training 1130_1. The at least one processor 220 may run the second training module 1170 to train the first AI model to infer the base image for training 1140_2 and the layer image for training 1140_1 to reduce the difference between the first frame image for training 11301 and an output image for training obtained by simulating the image 260 represented by the electronic device 100 according to the base image for training 1140_2, the layer image for training 1140_1, brightness information of the base panel 211 and brightness information of the layer panel 212. Training of the first AI model by the second training module 1170 will be described later in connection with FIG. 12B.

In an embodiment, the at least one processor 220 may run a third training module 1180 to train the second AI model to shift each of a plurality of sub-base images for training 1241 corresponding to a plurality of different views by using a reference shift value 1190 and infer a corrected base image for training 1250 including a plurality of sub-corrected base image for training 1251 having little difference from the plurality of shifted sub-base images for training. Training of the second AI model by the third training module 1180 will be described later in connection with FIG. 12C.

Figure 12A:
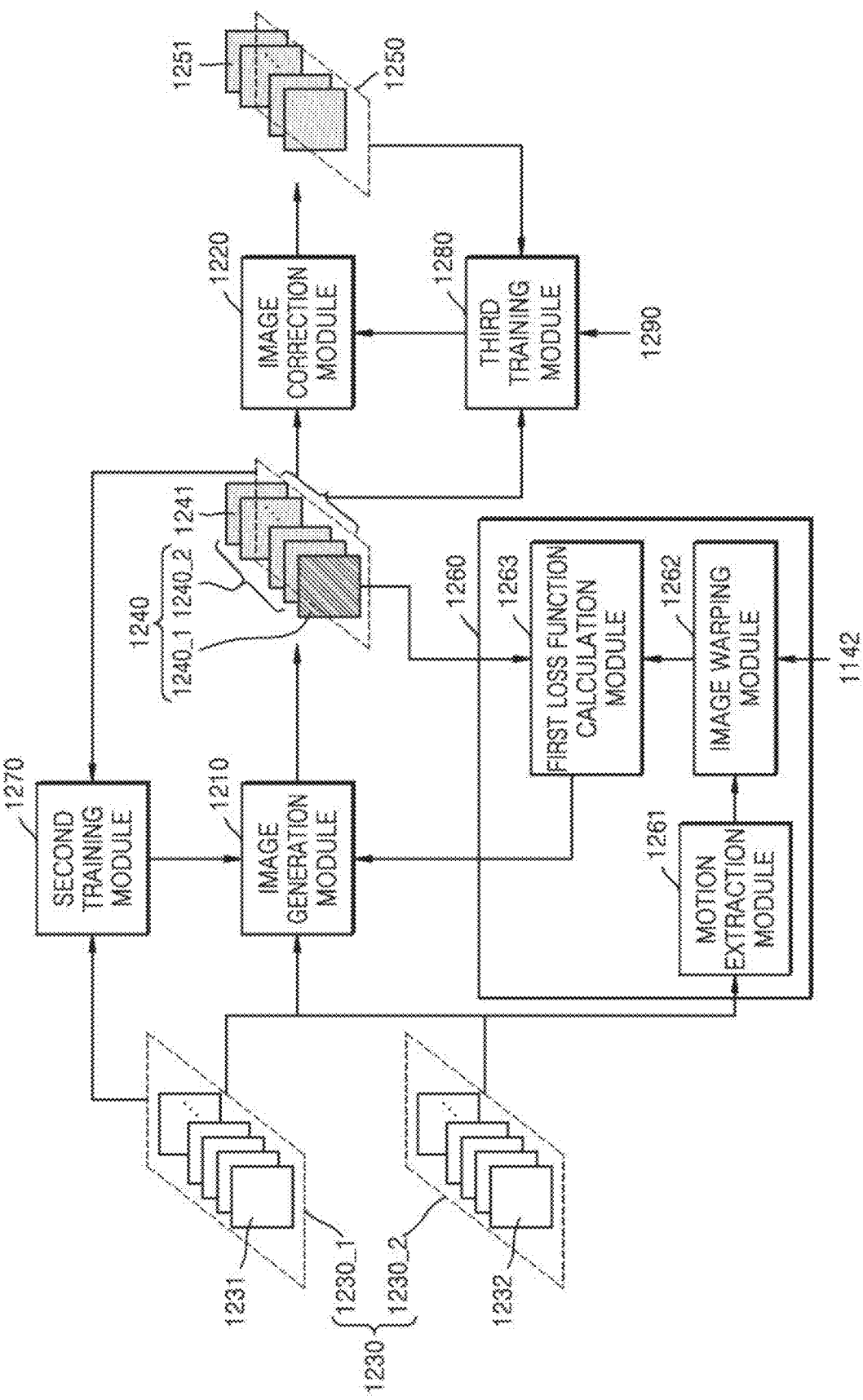
FIG. 12A is a diagram for illustrating a first loss function for training a first AI model, according to an embodiment of the disclosure.

FIG. 12A is a diagram for describing a first loss function to train a first AI model, according to an embodiment of the disclosure. Descriptions of an overlapping configuration with those of FIGS. 6, 8, 9 and 11 will not be repeated.

Referring to FIG. 12A, in an embodiment, the first training module 1260 may include a motion extraction module 1261, an image warping module 1262 and a first loss function calculation module 1263.

In an embodiment, the motion extraction module 1261 may be configured with instructions or program codes about an operation or function of extracting the motion 735 (see FIG. 7) between a first frame image for training 1230_1 and a second frame image for training 1230_2 based on the first frame image for training 1230_1 and the second frame image for training 1230_2.

In an embodiment, the motion extraction module 1261 may be configured with instructions or program codes about an operation or function of obtaining vector elements from the second frame to the first frame of the pixels included in a frame image for training 1230 based on the first frame image for training 1230_1 and the second frame image for training 1230_2, and extracting the motion 735 of the pixels included in the frame image for training 1230 from the second frame to the first frame based on the size and direction of the vector. In an embodiment, the pixels included in the frame image for training 1230 may be included in an object included in the frame image for training 1230.

In an embodiment, the motion extraction module 1261 may extract the motion 735 of the pixels included in the frame image for training 1230 from the second frame to the first frame through the Lucas-Kanade algorithm. Furthermore, the motion extraction module 1261 may extract the motion 735 of the pixels included in the frame image for training 1230 from the second frame to the first frame through a deep learning model such as FlowNet, LiteFlowNet, etc., and is not limited to an operation or function.

In an embodiment, the motion extraction module 1261 may be configured with instructions or program codes about an operation or function of extracting the motion 735 between the first frame image for training 1230_1 and the second frame image for training 1230_2 based on a center view image obtained from a center view among a plurality of view images for training 1231 included in the first frame image for training 1230_1 and a center view image obtained from the center view among a plurality of view images for training 1232 included in the second frame image for training 1230_2. The center view may correspond to a position where the user 250 is located right in front of the electronic device 100 and is able to look at the front of the object included in the image 260.

In an embodiment, the at least one processor 220 may extract the motion 753 between the first frame image for training 1230_1 and the second frame image for training 1230_2 by applying the first frame image for training 1230_1 and the second frame image for training 1230_2 to the motion extraction module 1261.

In an embodiment, the at least one processor 220 may extract the motion 753 between the first frame image for training 1230_1 and the second frame image for training 1230_2 by applying the center view image obtained from the center view among the plurality of view images for training 1231 included in the first frame image for training 1230_1 and the center view image obtained from the center view among the plurality of view images for training 1232 included in the second frame image for training 1230_2 to the motion extraction module 1261.

For convenience explanation, the motion 753 between the first frame image for training 1230_1 and the second frame image for training 1230_2 will now be described as a motion extracted by applying the center view image obtained from the center view among the plurality of center view images for training 1231 included in the first frame image for training 1230_1 and the center view image obtained from the center view among the plurality of center view images for training 1232 included in the second frame image for training 1230_2 to the motion extraction module 1261.

In an embodiment, the image warping module 1262 may be configured with instructions or program codes about an operation or function of warping the already-generated comparison layer image 1142 corresponding to the layer panel 212 in the second frame and the extracted motion 753.

In an embodiment, the comparison layer image 1142 may be a layer image generated by the at least one processor 220 running the image generation module 1210 in the second frame. The at least one processor 220 may generate the comparison layer image 1142 corresponding to the layer panel 212 in the second frame by applying the second frame image for training 1230_2 in the second frame of the input content for training 1230 and a third frame image for training in the third frame right before the second frame to the image generation module 1210.

In an embodiment, the at least one processor 220 may warp the comparison layer image 1142 by the motion 753 between the first frame image for training 1230_1 and the second frame image for training 1230_2 by applying the motion 753 between the first frame image for training 1230_1 and the second frame image for training 1230_2 extracted through the motion extraction module 1261 and the already-generated comparison layer image 1142 to the image warping module 1262.

In an embodiment, the comparison layer image warped by the motion 753 between the first frame image for training 1230_1 and the second frame image for training 1230_2 may be an image that reflects a change in position of the object included in the input content 1230 during the first frame from the second frame, as compared to the comparison layer image 1142.

In an embodiment, the first loss function calculation module 1263 may be configured with instructions or program codes about an operation or function of calculating a first loss function based on the warped comparison layer image and a layer image for training 1240_1 corresponding to the layer panel 212 in the first frame generated by the at least one processor 220 running the image generation module 1210.

In an embodiment, the first loss function calculation module 1263 may calculate the first loss function according to the following equation 1 based on the layer image for training 1240_1 and the warped comparison layer image.

$$L_1 = M_1 \times \|F_t - \hat{F}_{t-1}\|_1 \qquad \text{Equation 1}$$

In this case, $L_1$ is the first loss function, $M_1$ is a first masking value, $F_t$ is a layer image for training in the first frame, $\hat{F}_{t-1}$ is a warped comparison layer image in the second frame, and $\|F_t - \hat{F}_{t-1}\|_1$ is an L1 norm of a difference between $F_t$ and $\hat{F}_{t-1}$.

In an embodiment, the first masking value may prevent the comparison layer image, of which warping is not done as much as the motion 753 between the first frame image for training 1230_1 and the second frame image for training 12302, from being reflected in the value of the first loss function, in the operation of warping the comparison layer image 1241 by the motion 753 between the first frame image for training 1230_1 and the second frame image for training 1230_2 through the image warping module 1262. The first loss function calculation module 1263 may calculate the first masking value according to the following equation 2:

$$M_1 = \exp\left(-\alpha \times \|F_t - \hat{F}_{t-1}\|_2\right) \qquad \text{Equation 2}$$

In this case, $M_1$ is the first masking value, $\alpha$ is a random coefficient, $F_t$ is a layer image for training in the first frame, $\hat{F}_{t-1}$ is a warped comparison layer image in the second frame, and $\|F_t - \hat{F}_{t-1}\|_2$ is an L2 norm of a difference between $F_t$ and $\hat{F}_{t-1}$.

In an embodiment, when, through the first loss function calculation module 1263, the difference between $F_t$ and $\hat{F}_{t-1}$ is larger than a preset difference value, the at least one processor 220 determines that warping of the comparison layer image 1241 is not as much as the motion 753 between the first frame image for training 1230_1 and the second frame image for training 1230_2 and has the masking value approximate to 0. In this case, the value of the first loss function is also approximate to 0, so the associated training process may not be reflected in training the first AI model.

On the other hand, when, through the first loss function calculation module 1263, the difference between $F_t$ and $\hat{F}_{t-1}$ is equal to or smaller than the preset difference value, the at least one processor 220 determines that warping of the comparison layer image 1241 is as much as the motion 753 between the first frame image for training 1230_1 and the second frame image for training 1230_2 and has the masking value have a value approximate to 1. In this case, the associated training process may be reflected in training the first AI model.

The magnitude of the preset difference value may be determined by adjusting the magnitude of $\alpha$. The larger the magnitude of $\alpha$, the smaller the magnitude of the preset difference value.

The disclosure is not, however, limited thereto, and the first loss function calculation module 1263 may calculate the first loss function and the first masking value by using different mathematical equations.

In an embodiment, the value of the first loss function may be reduced as the difference between the layer image for training 1240_1 and the warped comparison layer image decreases. The at least one processor 220 may train the first AI model included in the image generation module 1210 to reduce the value of the first loss function through the first training module 1260. The at least one processor 220 may train the first AI model to infer the layer image for training 1240_1 with which a small value of the first loss function may be obtained, based on the first frame image for training 1230_1 and the second frame image for training 1230_2. A weight included in the first AI model may be updated to reduce the value of the first loss function.

Figure 12B:
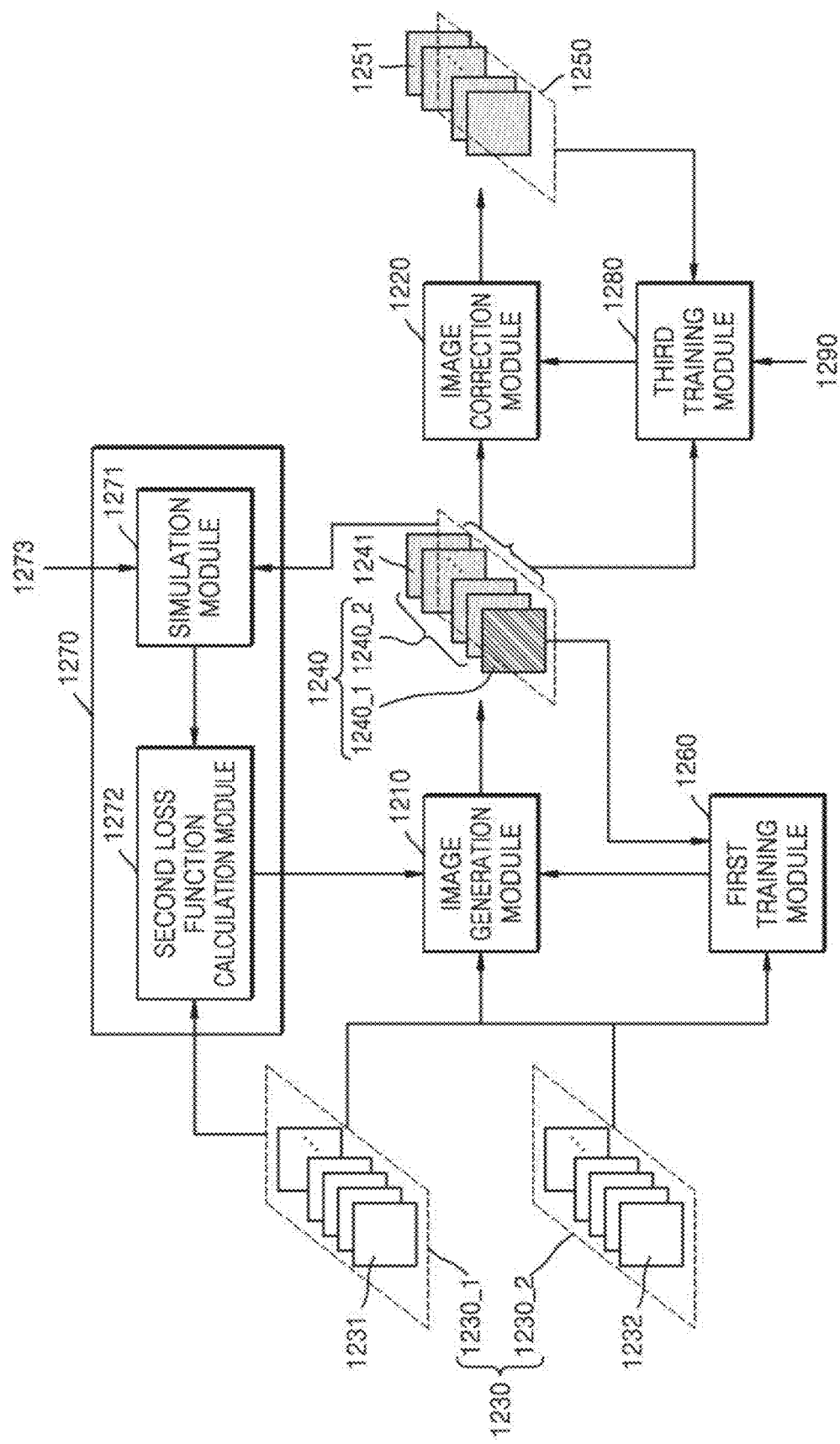
FIG. 12B is a diagram for illustrating a second loss function for training a first AI model, according to an embodiment of the disclosure.

FIG. 12B is a diagram for describing a second loss function to train the first AI model, according to an embodiment of the disclosure. Descriptions of an overlapping configuration with that of FIG. 12A will not be repeated.

Referring to FIG. 12B, in an embodiment, a second training module 1270 may include a simulation module 1271 and a second loss function calculation module 1272.

In an embodiment, the simulation module 1271 may be configured with instructions or program codes about an operation or function of performing simulation to obtain an output image for training, which is the image 260 provided for the user 250 in the first frame, in a case of displaying a base image for training 1240_2 generated by the at least one processor 220 through the image generation module 1210 on the base panel 211 and a layer image for training 1240_1 on the layer panel 212.

In an embodiment, the simulation module 1271 may be configured with instructions or program codes about an operation or function of performing simulation to obtain the output image for training based on the base image for training 1240_2, the layer image for training 1240_1 and panel information 1273 including information about the base panel 211 and information about the layer panel 212.

In an embodiment, the panel information 1273 may include a display type of the base panel 211, a display type of the layer panel 212, brightness information of the base panel 211, brightness information of the layer panel 212, and information about a distance between the base panel 211 and the layer panel 212.

In an embodiment, when the panel information 1273 includes information indicating that brightness of the layer panel 212 in displaying an image with the same gray scale is m times higher than brightness of the base panel 211 in displaying an image with the same gray scale, the at least one processor 220 may perform simulation to obtain the output image for training visible to the user 250 when the base image for training 1240_2 is displayed on the base panel 211 and the layer image for training 1240_1 is displayed on the layer panel 212 by reflecting the brightness information, through the simulation module 1271. With this, when the at least one processor 220 trains the first AI model through the second training module 1270 as will be described later, it may train the first AI model to infer the brightness of the base image for training 1240_2 m times higher than the brightness of the layer image for training 1240_1.

Furthermore, when the panel information 1273 includes information indicating that the display type of the at least one of the base panel 211 or the layer panel 212 is a display formed with a stack of mono-color panels, the at least one processor 220 may perform, through the simulation module 1271, simulation to obtain an output image for training which is visible to the user 250 when the base image for training 12402 is displayed on the base panel 211 and the layer image for training 12401 is displayed on the layer panel 212 by rendering each of the stacked mono-color panels to a panel including sub-color pixels such as R, G and B.

In an embodiment, the second loss function calculation module 1272 may be configured with instructions or program codes about an operation or function of calculating a second loss function based on the output image for training obtained by the at least one processor 220 through the simulation module 1271 and the first frame image for training 1230_1.

In an embodiment, the second loss function calculation module 1272 may be configured with instructions or program codes about an operation or function of calculating the second loss function based on a difference between a plurality of sub-output images for training corresponding to the plurality of different views which are included in the output image for training and a plurality of view images for training 1231 included in the first frame image for training 1230_1.

In an embodiment, the less the difference between the first frame image for training 1230_1 and the output image for training obtained by performing a simulation operation based on the base image for training 1240_2 and the layer image for training 1240_1 generated through the image generation module 1210 and the panel information 1273, the smaller the value of the second loss function.

In an embodiment, the at least one processor 220 may train the first AI model included in the image generation module 1210 to reduce the value of the second loss function through the second training module 1270. The at least one processor 220 may train the first AI model to infer the base image for training 1230_1 and the layer image for training 1240_1, with which a small value of the second loss function may be obtained, based on the first frame image for training 1230_1. A weight included in the first AI model may be updated to reduce the value of the second loss function.

Figure 12C:
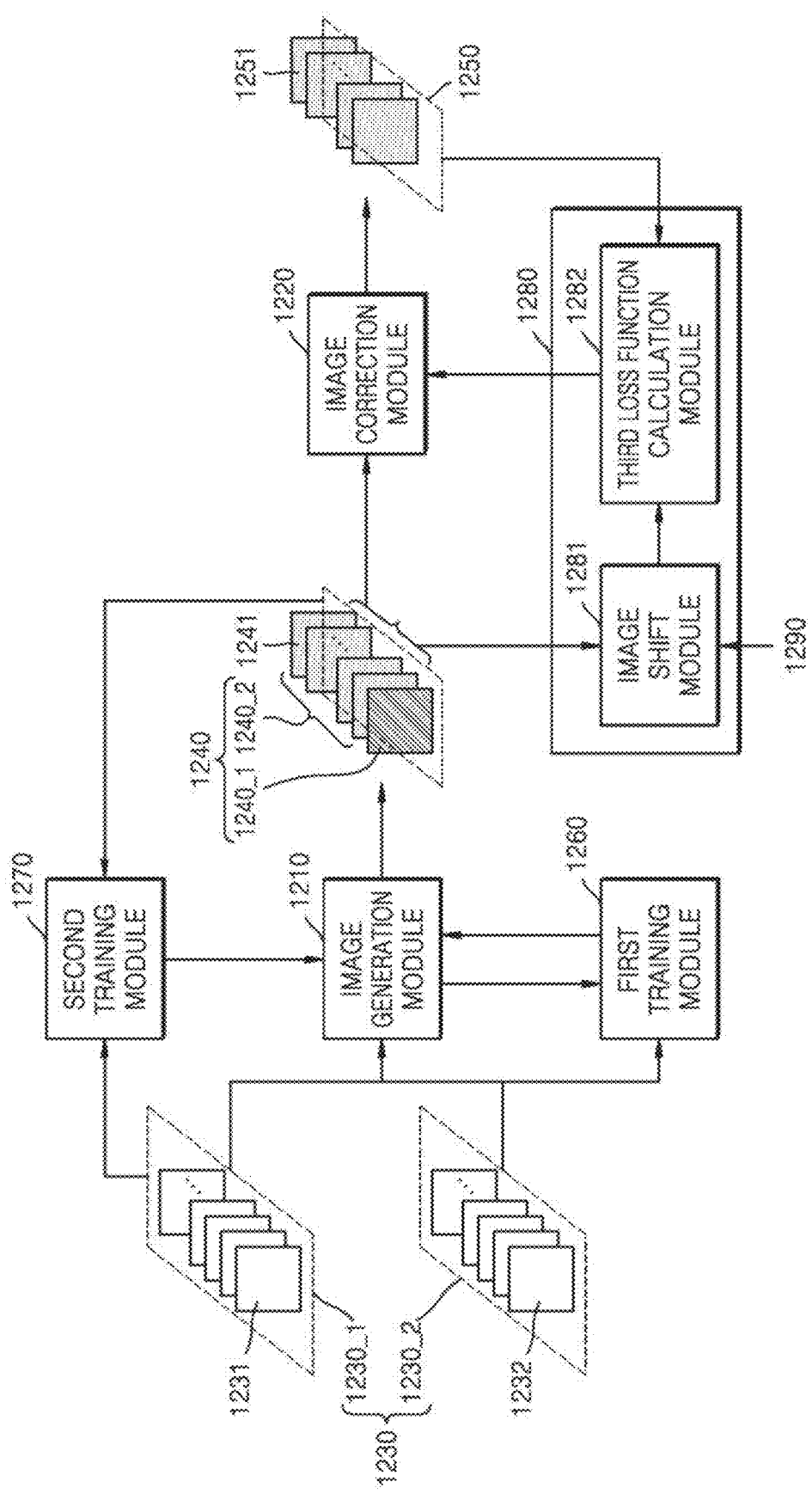
FIG. 12C is a diagram for illustrating a third loss function for training a second AI model, according to an embodiment of the disclosure.

FIG. 12C is a diagram for describing a third loss function to train the second AI model, according to an embodiment of the disclosure. Descriptions of an overlapping configuration with those of FIGS. 12A and 12B will not be repeated.

Referring to FIG. 12C, in an embodiment, a third training module 1280 may include an image shift module 1281 and a third loss function calculation module 1282.

In an embodiment, the image shift module 1281 may be configured with instructions or program codes about an operation or function of shifting each of the plurality of sub-base images for training 1241 by using a reference shift value based on the reference shift value 1290 and the base image for training 1240_2 including the plurality of sub-base images for training 1241 corresponding to a plurality of different views, which are generated through the image generation module 1210.

in an embodiment, when there are N+1 different views, $$\frac{N}{2}$$

views to the left of the electronic device 100 and $$\frac{N}{2}$$

views to the right of the electronic device 100 may be included based on the user 250 being located in a view from which the image 260 may be seen from the front of the electronic device 100. Referring to FIG. 10, the reference shift value 1290 may correspond to a distance between pixels in respective layer areas corresponding to adjacent two views.

In an embodiment, the image shift module 1281 may include instructions or program codes about an operation or function of shifting each of the plurality of sub-images for training 1241 corresponding to the plurality of different views to correspond to an adjacent view by using the reference shift value.

In an embodiment, each of the sub-images for training corresponding to two adjacent views, may include different position information of an object as each sub-image for training corresponds to a different view. The image shift module 1281 may include instructions or program codes about an operation or function of shifting the sub-images for training corresponding to two adjacent views by using the reference shift value so that the position information of the object in the shifted sub-image for training corresponds to the position information of the object in the sub-image for training before being shifted.

In an embodiment, assuming that one of the plurality of different views is a first view and a view adjacent to the first view is a second view, the image shift module 1281 may shift a sub-base image for training corresponding to the second view among the plurality of sub-base images for training 1241 to correspond to the first view by using the reference shift value. The position information of the object included in the shifted sub-base image for training corresponding to the second view may be the same as the position information of the object included in the sub-base image for training corresponding to the first view. Furthermore, information such as luminance, gray scale, color, etc., of the object included in the shifted sub-base image for training corresponding to the second view may be the same as information such as luminance, gray scale, color, etc., of the object included in the sub-base image for training corresponding to the first view before being shifted.

In an embodiment, the third loss function calculation module 1282 may be configured with instructions or program codes about an operation or function of calculating a third loss function based on the corrected base image for training 1250 generated by the at least one processor 220 running the image correction module 1220 and the sifted base image for training.

In an embodiment, the third loss function calculation module 1282 may be configured with instructions or program codes about an operation or function of calculating a third loss function based on a sub-corrected base image for training corresponding to the first view among the plurality of sub-corrected base images for training 1251 included in the corrected base image for training 1250 and a sub-base image for training corresponding to the second view among the plurality of shifted sub-base images for training included in the shifted base image for training.

In an embodiment, the third loss function calculation module 1282 may calculate a third loss function according to the following equation 3 based on the sub-corrected base image for training corresponding to the first view and the sub-base image for training corresponding to the second view. The third loss function calculation module 1282 may obtain a loss value corresponding to the first view based on the sub-corrected base image for training corresponding to a first view among N+1 views and the sub-base image for training corresponding to the second view, and calculate the third loss function according to the following equation 3, which repeats the process for N+1 views.

$$L_3 = \sum_{n=1}^{N+1} \left( M_2 \times \left\| L_n - \hat{L}_{n-1} \right\|_1 \right) \qquad \text{Equation 3}$$

In this case, $L_3$ is the third loss function, $M_2$ is a second masking value $L_n$ is a sub-corrected base image for training corresponding to n-th view, $\hat{L}_{n-1}$ is a shifted sub-base image for training in the (n−1)-th view, and $\|L_n - \hat{L}_{n-1}\|_1$ is an L1 norm of a difference between $L_n$ and $\hat{L}_{n-1}$.

In an embodiment, the second masking value may prevent a sub-base image for training, of which the shift does not reach the reference shift value 1290, in the operation of shifting the sub-base image for training corresponding to the (n−1)-th view to correspond to the n-the view through the image shift module 1281 by using the reference shift value 1290 from being reflected in the third loss function value. The third loss function calculation module 1282 may calculate the second masking value according to the following equation 4:

$$M_2 = \exp\left(-\beta \times \left\| L_n - \hat{L}_{n-1} \right\|_2 \right) \qquad \text{Equation 4}$$

In this case, $M_2$ is the second masking value, $\beta$ is a random coefficient, n is a sub-corrected base image for training corresponding to the n-the view, $\hat{L}_{n-1}$ is a shifted sub-base image for training in the (n−1)-th view, and $\|L_n - \hat{L}_{n-1}\|_2$ is an L2 norm of a difference between $L_n$ and $\hat{L}_{n-1}$.

In an embodiment, through the third loss function calculation module 1282, the at least one processor 220 may determine that warping of the image shift module 1281 has not been done as much as the reference shift value 1290 when a difference between $L_n$ and $\hat{L}_{n-1}$ is larger than a preset difference value, and may have the masking value for the n-th of N+1 views approximate to 0. In this case, a component of the n-th view of the value of the third loss function has a value approximate to 0, so the associated training process may not be reflected in training the second AI model.

On the other hand, through the third loss function calculation module 1282, the at least one processor 220 may determine that the shift operation by the image shift module 1281 has been done as much as the reference shift value 1290 when the difference between $L_n$ and $\hat{L}_{n-1}$ is equal to or smaller than the preset difference value, and may have the masking value for the n-th of N+1 views approximate to 1. In this case, the associated training process for the n-th view may be reflected in training the second AI model.

The magnitude of the preset difference value may be determined by adjusting the magnitude of β. The larger the magnitude of β, the smaller the preset difference value.

The disclosure is not, however, limited thereto, and the third loss function calculation module 1282 may calculate the third loss function and the second masking value by using different mathematical equations.

In an embodiment, the less the difference between the plurality of sub-corrected base images for training corresponding to the plurality of different views and the plurality of shifted sub-base images for training, the smaller the value of the third loss function. The at least one processor 220 may train the third AI model included in the image correction module 1220 to reduce the value of the third loss function through the third training module 1280. The at least one processor 220 may train the third AI model to infer the corrected base image for training 1250 including the plurality of sub-corrected base images for training 1251, with which a smaller value of the third loss function may be obtained, based on the base image for training 1240_2 including the plurality of sub-base images for training 1241. A weight included in the third AI model may be updated to reduce the value of the third loss function.

The program executed by the electronic device as described in the disclosure may be implemented in hardware, software, and/or a combination thereof. The program may be performed by any system capable of performing computer-readable instructions.

The software may include a computer program, codes, instructions, or one or more combinations of them, and may configure a processing device to operate as desired or instruct the processing device independently or collectively.

The software may be implemented with a computer program including instructions stored in a computer-readable recording (or storage) medium. Examples of the computer-readable recording medium include a magnetic storage medium (e.g., a read only memory (ROM), a floppy disk, a hard disk, etc.), and an optical recording medium (e.g., a compact disc ROM (CD-ROM), or a digital versatile disc (DVD)). The computer-readable recording medium may also be distributed over network coupled computer systems so that the computer-readable code is stored and executed in a distributed fashion. The recording media may be read by the computer, stored in the memory, and executed by the processor.

The computer-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

Furthermore, the program according to the embodiments of the disclosure may be provided in a computer program product. The computer program product may be a commercial product that may be traded between a seller and a buyer.

The computer program product may include a software program and a computer-readable storage medium having the software program stored thereon. For example, the computer program product may include a product (e.g., a downloadable application) in the form of a software program that is electronically distributed by the manufacturer of the electronic device or by an electronic market (e.g., Samsung Galaxy Store®). For the electronic distribution, at least a portion of the software program may be stored in a storage medium or arbitrarily created. In this case, the storage medium may be one of a server of the manufacturer of the electronic device or of a relay server that temporarily stores the software program.

Although the disclosure is described with reference to one or more embodiments as described above and accompanying drawings, it will be apparent to those of ordinary skill in the art that various modifications and changes can be made to the embodiments. For example, the aforementioned method may be performed in a different order, and/or the aforementioned components such as a computer system or a module may be combined in a different form from what is described above, and/or replaced or substituted by other components or equivalents thereof, to obtain appropriate results.

What is claimed is:

1. An electronic device comprising:
   a base panel;
   a layer panel on the base panel;
   memory storing at least one instruction; and
   at least one processor configured to execute the at least one instruction stored in the memory,
   wherein the at least one instruction, when executed by the at least one processor, causes the electronic device to:
      obtain a first frame image in a first frame and a second frame image in a second frame before the first frame,
      generate, by applying the first frame image and the second frame image to an image generation module, a base image corresponding to the base panel in the first frame and a layer image corresponding to the layer panel in the first frame and based on a motion between the first frame image and the second frame image,
      generate a corrected base image based on the motion between the first frame image and the second frame image by applying the base image or the layer image to an image correction module, and
      display the corrected base image on the base panel and display the layer image on the layer panel.

2. The electronic device of claim 1, further comprising:
   an optical layer between the base panel and the layer panel,
   wherein the base image comprises a plurality of sub-base images corresponding to a plurality of different views, respectively, and
   wherein the at least one instruction, when executed by the at least one processor, causes the electronic device to generate, by applying the base image or the layer image to the image correction module, the corrected base image that is based on a difference between the plurality of sub-base images from the plurality of different views and includes a plurality of sub-corrected base images.

3. The electronic device of claim 1, wherein the image generation module comprises a first artificial intelligence (AI) model trained to infer the base image and the layer image, based on the first frame image and the second frame image, and
   wherein the first AI model is configured to:
      obtain a first training frame image in a first training frame and a second training frame image in the second frame before the first frame,
      extract a motion between the first training frame image and the second training frame image,
      use the extracted motion to warp an already-generated comparison layer image corresponding to the layer panel in the second frame, and
      be trained based on a first loss function based on a layer training image corresponding to the layer panel in the first frame and the warped comparison layer image, which are generated through the first AI model.

4. The electronic device of claim 3, wherein each of the first training frame image and the second training frame image comprises a plurality of view images for training which are obtained from a plurality of different views, and
   wherein the motion between the first training frame image and the second training frame image is extracted from a center view image obtained from a center view among the plurality of view images for training included in the first training frame image and a center view image obtained from the center view among the plurality of view images for training included in the second training frame image.

5. The electronic device of claim 3, wherein the first loss function is determined based on a difference between the layer training image and the warped comparison layer image, and
   wherein the first AI model is trained to reduce the difference between the layer training image and the warped comparison layer image based on the first loss function.

6. The electronic device of claim 3, wherein the first AI model is configured to:
   generate, by applying the first training frame image and the second training frame image to the first AI model, a base training image corresponding to the base panel in the first frame and the layer training image corresponding to the layer panel in the first frame,
   obtain an output training image in the first frame based on the base training image, the layer training image, brightness information of the base panel and brightness information of the layer panel, and
   be trained based on a second loss function based on a difference between the first training frame image and the output training image.

7. The electronic device of claim 1, wherein the at least one instruction, when executed by the at least one processor, causes the electronic device to generate the corrected base image by applying the first frame image and the layer image to the image correction module.

8. The electronic device of claim 2, wherein the first frame image comprises a plurality of view images obtained from the plurality of different views,
   wherein the at least one instruction, when executed by the at least one processor, causes the electronic device to execute the at least one instruction to generate the corrected base image by applying the first frame image, the layer image and a plurality of shift values corresponding to the plurality of different views, respectively,
   wherein the image correction module comprises instructions for performing an operation or function of shifting the layer image by using each of the plurality of shift values, and generating the corrected base image by using each of the plurality of view images and a plurality of shifted layer images corresponding to the plurality of view images, and
   wherein the plurality of shift values are determined based on at least one of a distance between the base panel and the layer panel, a resolution of the layer panel or the plurality of different views.

9. The electronic device of claim 2, wherein the image correction module comprises a second AI model trained to infer the corrected base image, based on the base image and a reference shift value,
wherein the second AI model is configured to:
obtain the reference shift value and a base training image including a plurality of sub-base training images corresponding to the plurality of different views which are generated through the image generation module,
shift each of the plurality of sub-base training images by using the reference shift value, and
be trained based on a third loss function based on a corrected base training image and the shifted base training image, which are generated through the second AI model, and
wherein the reference shift value is determined based on at least one of a distance between the base panel and the layer panel or a resolution of the layer panel.

10. The electronic device of claim 9, wherein the third loss function is identified based on a difference between a sub-corrected base training image corresponding to a first view among a plurality of sub-corrected base training images included in the corrected base training image and a sub-base training image obtained by shifting a sub-base training image corresponding to a second view adjacent to the first view among the plurality of shifted sub-base training images included in the shifted base training image, and
wherein the second AI model is trained to reduce the difference between the sub-corrected base training image and the shifted sub-base training image based on the third loss function.

11. A method of operating an electronic device including a base panel and a layer panel arranged on the base panel, the method comprising:
obtaining a first frame image in a first frame and a second frame image in a second frame before the first frame;
generating, by applying the first frame image and the second frame image to an image generation module, a base image corresponding to the base panel in the first frame and a layer image corresponding to the layer panel in the first frame and based on a motion between the first frame image and the second frame image;
generating a corrected base image based on the motion between the first frame image and the second frame image by applying the base image or the layer image to an image correction module; and
displaying the corrected base image on the base panel and displaying the layer image on the layer panel.

12. The method of claim 11, wherein the electronic device comprises an optical layer between the base panel and the layer panel,
wherein the base image comprises a plurality of sub-base images corresponding to a plurality of different views, respectively, and
wherein the generating of the corrected base image comprises generating, by applying the base image or the layer image to the image correction module, the corrected base image that is based on a difference between the plurality of sub-base images from the plurality of different views and includes a plurality of sub-corrected base images.

13. The method of claim 11, wherein the image generation module comprises a first artificial intelligence (AI) model trained to infer the base image and the layer image, based on the first frame image and the second frame image, and
wherein the first AI model is trained by:
obtaining a first training frame image in a first training frame and a second training frame image in the second frame before the first frame;
extracting a motion between the first training frame image and the second training frame image;
using the extracted motion to warp an already-generated comparison layer image corresponding to the layer panel in the second frame; and
training the first AI model based on a first loss function based on a layer image for training corresponding to the layer panel in the first frame and the warped comparison layer image, which are generated through the first AI model.

14. The method of claim 13, wherein each of the first training frame image and the second training frame image comprises a plurality of view images for training obtained from a plurality of different views, and
wherein in the extracting of the motion between the first training frame image and the second training frame image, the motion is extracted from a center view image obtained from a center view among the plurality of view images for training included in the first training frame image and a center view image obtained from the center view among the plurality of view images for training included in the second training frame image.

15. The method of claim 13,
wherein the training the first AI comprises
generating a base image for training corresponding to the base panel in the first frame and the layer image for training corresponding to the layer panel in the first frame by applying the first frame image for training and the second frame image for training to the first AI model;
obtaining an output image for training in the first frame based on the base image for training, the layer image for training, brightness information of the base panel and brightness information of the layer panel; and
training the first AI model based on a second loss function based on a difference between the first frame image for training and the output image for training.

16. The method of claim 11,
wherein the generating of the corrected based image comprises
generating the corrected base image by applying the first frame image and the layer image to the image correction module.

17. The method of claim 12,
wherein the first frame image comprises a plurality of view images obtained from a plurality of different views,
wherein the generating of the corrected base image comprises
generating the corrected base image by applying the first frame image, the layer image and a plurality of shift values corresponding to multiple views, respectively,
wherein the image correction module comprises
instructions for performing an operation or function of shifting the layer image by using each of the plurality of shift values; and instructions for performing an operation or function of generating a corrected base image by using each of the plurality of view images and a plurality of shifted layer images corresponding to the plurality of view images,
wherein the plurality of shift values are determined based on at least one of a distance between the base panel and the layer panel, a resolution of the layer panel or a plurality of different views.

18. The method of claim 12,
wherein the image correcting module comprises a second AI model trained to infer a corrected base image based on the base image,
wherein the second AI model is trained by;
obtaining a reference shift value and a base image for training including a plurality of sub-base images for training corresponding to the plurality of different views which are generated through the image generation module;
shifting each of the plurality of base images for training by using the reference shift value; and
training the second AI model based on a third loss function based on the corrected base image for training and the shifted base image for training, which are generated through the second AI model.

19. The method of claim 18,
wherein the training the second AI model based on the third loss function comprises
calculating the third loss function based on a difference between a sub-corrected base image for training corresponding to a first view among the plurality of sub-corrected base images for training included in the corrected base image for training and a shifted sub-base image for training corresponding to a second view adjacent to the first view among the plurality of shifted sub-base images for training included in the shifted base image for training; and
training the second AI model to have a smaller difference between the sub-corrected base image for training and the shifted sub-base image for training based on the third loss function.

20. A non-transitory computer-readable recording medium having a program recorded thereon for a computer to perform a method of operating an electronic device including a base panel and a layer panel arranged on the base panel, the method comprising:
obtaining a first frame image in a first frame and a second frame image in a second frame before the first frame;
generating, by applying the first frame image and the second frame image to an image generation module, a base image corresponding to the base panel in the first frame and a layer image corresponding to the layer panel in the first frame and based on a motion between the first frame image and the second frame image;
generating a corrected base image based on the motion between the first frame image and the second frame image by applying the base image or the layer image to an image correction module; and
displaying the corrected base image on the base panel and displaying the layer image on the layer panel.

* * * * *